(12) United States Patent
Barber et al.

(10) Patent No.: US 11,327,161 B2
(45) Date of Patent: May 10, 2022

(54) METHOD AND SYSTEM FOR SIDELOBE SUPPRESSION IN PHASE ENCODED DOPPLER LIDAR

(71) Applicant: BLACKMORE SENSORS & ANALYTICS, LLC, Palo Alto, CA (US)

(72) Inventors: Zeb William Barber, Bozeman, MT (US); Stephen C. Crouch, Bozeman, MT (US); Emil A. Kadlec, Bozeman, MT (US)

(73) Assignee: BLACKMORE SENSORS & ANALYTICS, LLC, Mountain View, CA (US)

( * ) Notice: Subject to any disclaimer, the term of this patent is extended or adjusted under 35 U.S.C. 154(b) by 0 days.

(21) Appl. No.: 17/228,335

(22) Filed: Apr. 12, 2021

(65) Prior Publication Data

US 2021/0255294 A1 Aug. 19, 2021

Related U.S. Application Data

(63) Continuation of application No. 16/928,823, filed on Jul. 14, 2020, now Pat. No. 11,002,837.

(Continued)

(51) Int. Cl.
*G01C 3/08* (2006.01)
*G01S 7/4912* (2020.01)
(Continued)

(52) U.S. Cl.
CPC .......... *G01S 7/4917* (2013.01); *G01S 7/4876* (2013.01); *G01S 17/34* (2020.01); *G01S 17/89* (2013.01); *G01S 17/931* (2020.01)

(58) Field of Classification Search
CPC ........ G01S 17/89; G01S 17/87; G01S 7/4817; G01S 7/4815; G01S 7/487; G01S 17/10; G01C 3/08; G01C 1/06
See application file for complete search history.

(56) References Cited

U.S. PATENT DOCUMENTS

| 6,580,497 | B1 | 6/2003 | Asaka et al. |
| 9,097,646 | B1 | 8/2015 | Campbell et al. |
| (Continued) | | | |

FOREIGN PATENT DOCUMENTS

| EP | 3 149 511 | 4/2017 |
| WO | WO-2018/107237 A1 | 6/2018 |
| WO | WO-2018/144853 A1 | 8/2018 |

OTHER PUBLICATIONS

Partial International Search Report on PCT PCT/US2020/041991 dated May 18, 2021.

*Primary Examiner* — Samantha K Nickerson
(74) *Attorney, Agent, or Firm* — Foley & Lardner LLP

(57) ABSTRACT

A light detection and ranging (LIDAR) system includes one or more processors, and one or more computer-readable storage mediums storing instructions which, when executed by the one or more processors, cause the one or more processors to determine a code that has a first number of symbols, transmit, to an environment, an optical signal generated based on the code such that the first number of symbols are transmitted in a first duration, in response to transmitting the optical signal, receive a returned optical signal that is reflected from an object in the environment, sample, from the returned optical signal, a second number of symbols in a second duration, the second number being different from the first number, and determine, based on the second number of symbols, a range to the object.

20 Claims, 22 Drawing Sheets

Related U.S. Application Data

(60) Provisional application No. 62/874,351, filed on Jul. 15, 2019.

(51) Int. Cl.
  *G01S 17/931* (2020.01)
  *G01S 7/487* (2006.01)
  *G01S 17/34* (2020.01)
  *G01S 17/89* (2020.01)

(56) References Cited

U.S. PATENT DOCUMENTS

| | | |
|---|---|---|
| 9,791,551 B1 * | 10/2017 | Eshraghi ............ G01S 7/038 |
| 2002/0093640 A1 | 7/2002 | Watanabe et al. |
| 2011/0317147 A1 | 12/2011 | Campbell et al. |
| 2012/0146834 A1 | 6/2012 | Karr |
| 2016/0259038 A1 | 9/2016 | Retterath et al. |
| 2016/0294591 A1 | 10/2016 | Kurchuk et al. |
| 2016/0316112 A1 | 10/2016 | Tadano et al. |
| 2017/0299697 A1 | 10/2017 | Swanson |
| 2018/0299553 A1 | 10/2018 | Takemoto et al. |
| 2019/0094346 A1 | 3/2019 | Dumoulin et al. |
| 2019/0227172 A1 | 7/2019 | Schaefer |
| 2019/0310370 A1 | 10/2019 | Schmitz |
| 2020/0003900 A1 | 1/2020 | Stochino |
| 2020/0301014 A1 | 9/2020 | Schoenlieb et al. |

* cited by examiner

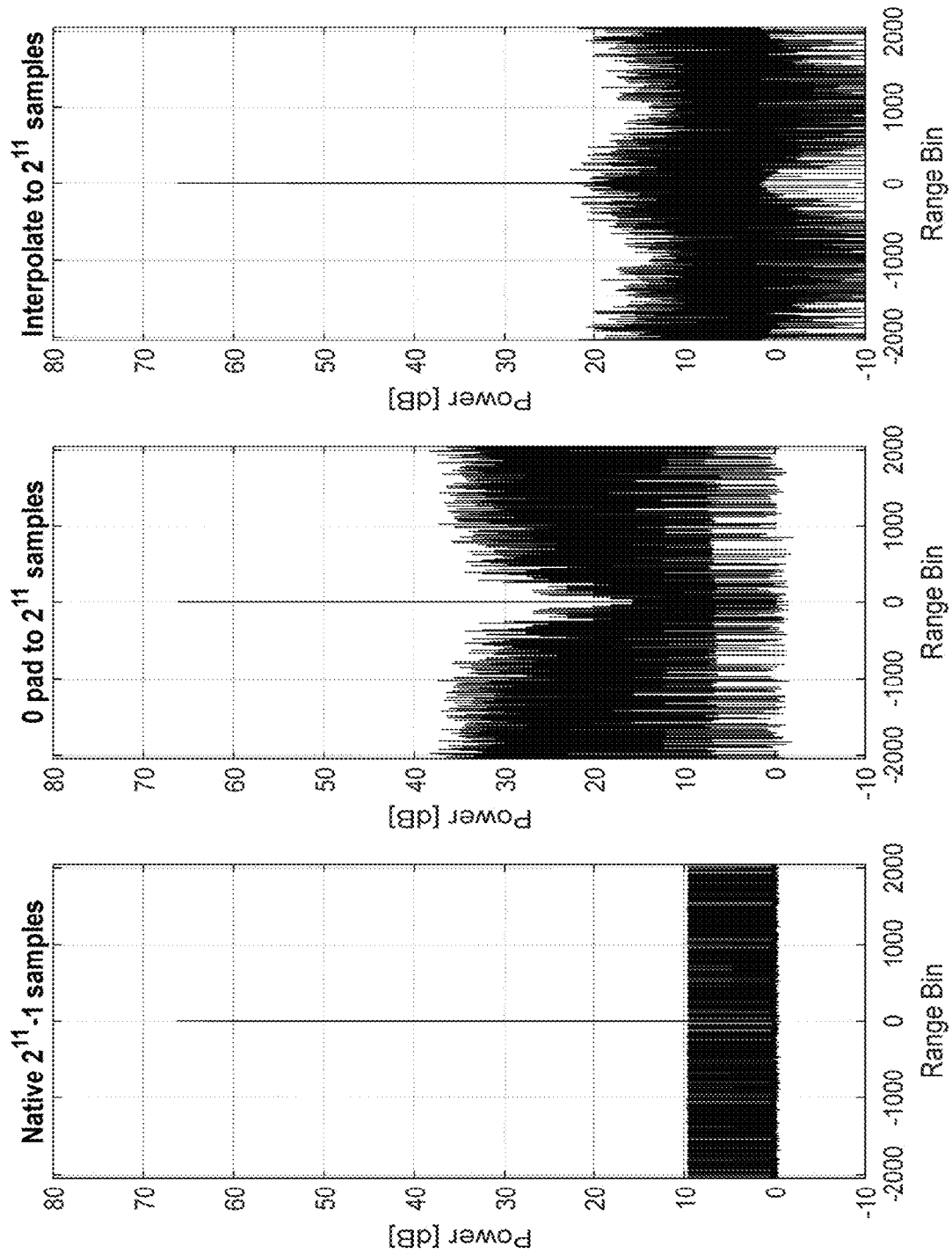

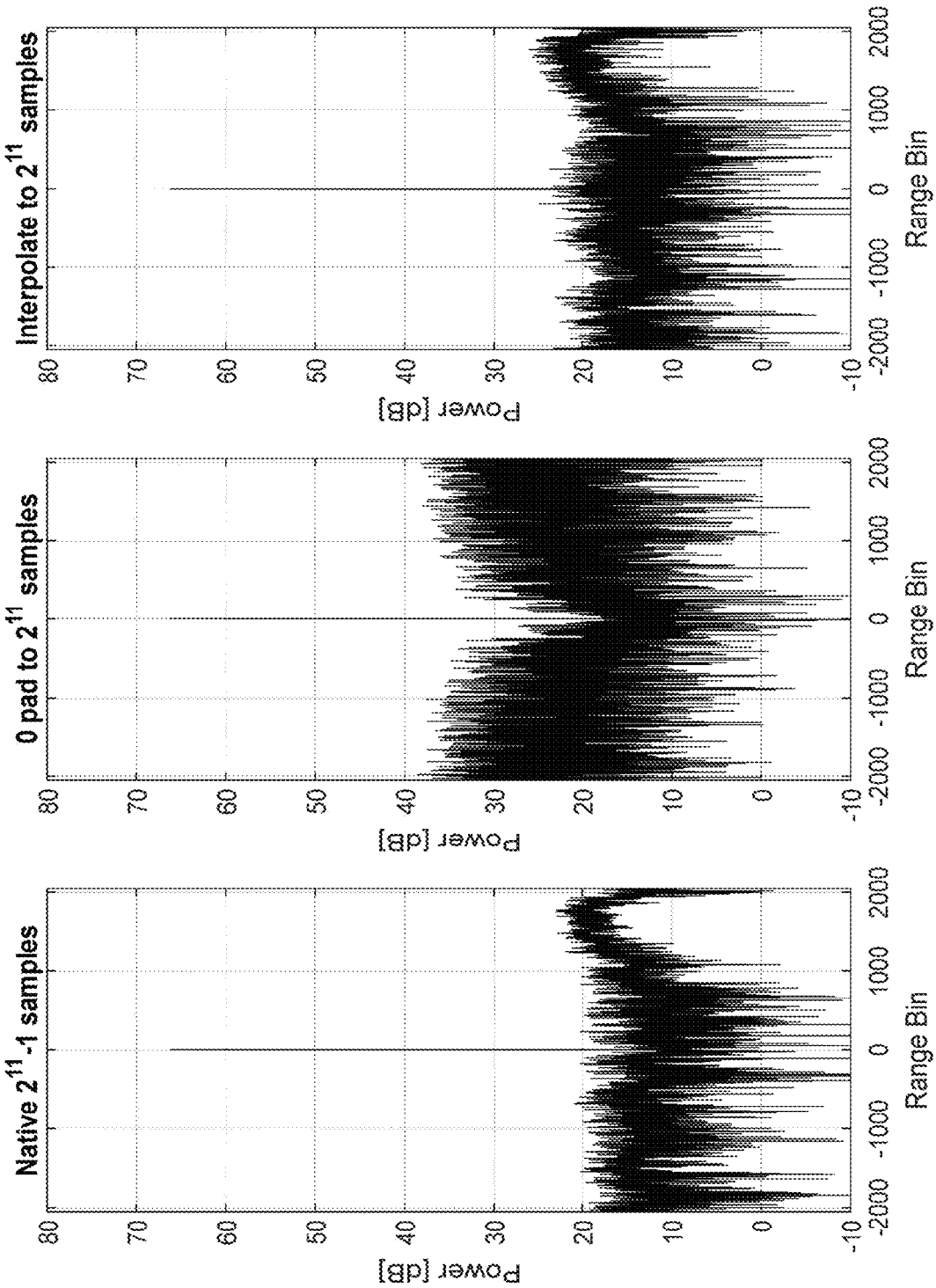

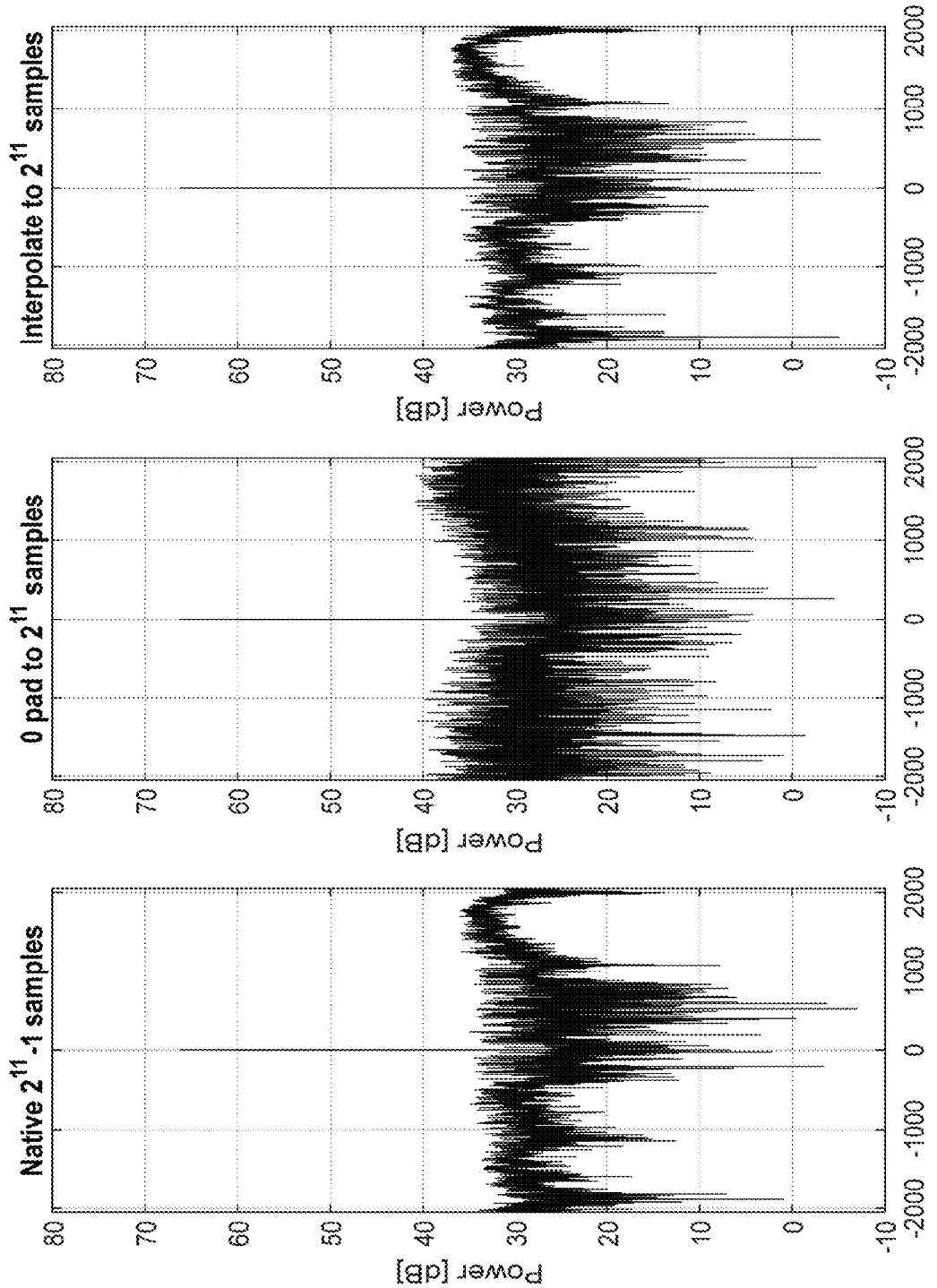

1400B

determining a sequence code that is indicative of a sequence of phases for an optical signal
1401B modulating an optical signal based on the sequence code to produce a phase-encoded optical signal
1403B transmitting the phase-encoded optical signal to an environment
1405B receiving, from the environment, a returned optical signal in response to transmitting the phase-encoded optical signal
1407B generating, based on the returned optical signal, an electrical signal
1409B determining a Doppler frequency shift in the returned optical signal
1411B

FIG. 14B

METHOD AND SYSTEM FOR SIDELOBE SUPPRESSION IN PHASE ENCODED DOPPLER LIDAR

CROSS-REFERENCE TO RELATED APPLICATIONS

This application is a continuation application of U.S. patent application Ser. No. 16/928,823 filed Jul. 14, 2020, which claims the benefit of and priority to U.S. Provisional Patent Application No. 62/874,351, filed Jul. 15, 2019. The entire contents of U.S. Provisional Patent Application No. 62/874,351 and U.S. patent application Ser. No. 16/928,823 are hereby incorporated by reference as if fully set forth herein.

BACKGROUND

Optical detection of range using lasers, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

SUMMARY

Aspects of the present disclosure relate generally to light detection and ranging (LIDAR) in the field of optics, and more particularly to systems and method for sidelobe suppression in phase-encoded Doppler LIDAR to support the operation of a vehicle.

One implementation disclosed herein is directed a LIDAR system for sidelobe suppression in phase-encoded Doppler LIDAR. In some implementations, the LIDAR system includes one or more processors; and one or more computer-readable storage mediums storing instructions which, when executed by the one or more processors, cause the one or more processors to determine a sequence code that is indicative of a sequence of phases for an optical signal; modulate an optical signal based on the sequence code to produce a phase-encoded optical signal; transmit the phase-encoded optical signal to an environment; receive, from the environment, a returned optical signal in response to transmitting the phase-encoded optical signal; generate, based on the returned optical signal, an electrical signal; and determine a Doppler frequency shift in the returned optical signal based on the electrical signal.

In another aspect, the present disclosure is directed to an autonomous vehicle control system including one or more processors; and one or more computer-readable storage mediums storing instructions which, when executed by the one or more processors, cause the one or more processors to determine a sequence code that is indicative of a sequence of phases for an optical signal. In some implementations, the one or more computer-readable storage mediums storing instructions which, when executed by the one or more processors, cause the one or more processors to cause an optical signal to be modulated based on the sequence code to produce a phase-encoded optical signal. In some implementations, the one or more computer-readable storage mediums storing instructions which, when executed by the one or more processors, cause the one or more processors to cause an optical detector to receive a returned signal from an environment by causing the phase-encoded optical signal to be transmitted into the environment. In some implementations, the one or more computer-readable storage mediums storing instructions which, when executed by the one or more processors, cause the one or more processors to obtain an electrical signal from the optical detector in response to causing the optical detector to receive the returned signal from the environment. In some implementations, the one or more computer-readable storage mediums storing instructions which, when executed by the one or more processors, cause the one or more processors to determine a Doppler frequency shift in the returned optical signal based on the electrical signal. In some implementations, the one or more computer-readable storage mediums storing instructions which, when executed by the one or more processors, cause the one or more processors to control operation of a vehicle using the Doppler frequency shift.

In another aspect, the present disclosure is directed to an autonomous vehicle. In some implementations, the autonomous vehicle includes at least one of a steering system or a braking system. In some implementations, the autonomous vehicle includes a vehicle controller comprising one or more processors configured to determine a sequence code that is indicative of a sequence of phases for an optical signal. In some implementations, the one or more processors are configured to modulate an optical signal based on the sequence code to produce a phase-encoded optical signal. In some implementations, the one or more processors are configured to transmit the phase-encoded optical signal to an environment. In some implementations, the one or more processors are configured to receive, from the environment, a returned optical signal in response to transmitting the phase-encoded optical signal. In some implementations, the one or more processors are configured to generate, based on the returned optical signal, an electrical signal. In some implementations, the one or more processors are configured to determine a Doppler frequency shift in the returned optical signal based on the electrical signal. In some implementations, the one or more processors are configured to control the at least one of the steering system or the braking system using the Doppler frequency shift.

Still other aspects, features, and advantages are readily apparent from the following detailed description, simply by illustrating a number of particular implementations and implementations, including the best mode contemplated for carrying out the present disclosure. Other implementations are also capable of other and different features and advantages, and its several details can be modified in various obvious respects, all without departing from the spirit and scope of the present disclosure. Accordingly, the drawings and description are to be regarded as illustrative in nature, and not as restrictive.

BRIEF DESCRIPTION OF THE DRAWINGS

Implementations are illustrated by way of example, and not by way of limitation, in the figures of the accompanying drawings in which like reference numerals refer to similar elements and in which:

FIG. 6A is a graph that illustrates an example autocorrelation of received signal based on a Z=11 m-sequence code (#1 from Church), according to an implementation;

FIG. 6B is a graph that illustrates an example autocorrelation of received signal based on a Z=11 m-sequence code (#1 from Church) padded with zeros to a length of a power of two according to an implementation;

FIG. 6C is a graph that illustrates an example autocorrelation of received signal based on a Z=11 m-sequence code (#1 from Church) where the signal is linearly interpolated from 4094 samples to 4096 samples prior to fast Fourier transform (FFT) processing, according to an implementation;

FIG. 7A through FIG. 7C show processing similar to that in FIG. 6A through FIG. 6C, but for a received signal Doppler shifted a non-integer (3.05) multiple of the native frequency, according to an implementation;

FIG. 8A through FIG. 8C show processing similar to that in FIG. 6A through FIG. 6C, but for a received signal Doppler shifted a different non-integer (3.25) multiple of the native frequency, according to an implementation;

FIG. 14B is a flow diagram that illustrates an example method 1400B to reduce sidelobes in efficient FFT processing of phase-encoded LIDAR, according to an implementation.

DETAILED DESCRIPTION

To achieve acceptable range accuracy and detection sensitivity, direct long-range LIDAR systems use short pulse lasers with low pulse repetition rate and extremely high pulse peak power. The high pulse power can lead to rapid degradation of optical components. Chirped and phase-encoded LIDAR systems use long optical pulses with relatively low peak optical power. In this configuration, the range accuracy increases with the chirp bandwidth or length of the phase codes in a given time interval rather than the pulse duration, and therefore excellent range accuracy can still be obtained with less degradation of optical components.

LIDAR detection with phase-encoded microwave signals modulated onto an optical carrier have been used as well. Here bandwidth B is proportional to the inverse of the duration r of the pulse that carries each phase ($B=1/\tau$), with any phase-encoded signal made up of a large number of such pulses. This technique relies on correlating a sequence of phases (or phase changes) of a particular frequency in a return signal with that in the transmitted signal. A time delay associated with a peak in correlation is related to range by the speed of light in the medium. Range resolution is proportional to the pulse width $\tau$. Advantages of this technique include the need for fewer components, and the use of mass-produced hardware components developed for phase-encoded microwave and optical communications.

Recent work shows arrangement of optical components and coherent processing to detect Doppler shifts in returned signals that provide not only improved range but also relative signed speed on a vector between the LIDAR system and each external object. These systems are called hi-res range-Doppler LIDAR herein. See for example World Intellectual Property Organization (WIPO) publications WO2018/160240 and WO/2018/144853 based on Patent Cooperation Treaty (PCT) patent applications PCT/US2017/062703 and PCT/US2018/016632, respectively.

However, the conventional LIDAR systems implementing the aforementioned approaches to phase-encoded Doppler LIDAR often lead to spurious sidelobes that can degrade the detection capability of the LIDAR system.

Accordingly, the present disclosure is directed to systems and methods for sidelobe suppression in phase-encoded Doppler LIDAR that improve the capability of the LIDAR system to perform optical range measurements for operating a vehicle.

In the following description, for the purposes of explanation, numerous specific details are set forth in order to provide a thorough understanding of the present disclosure.

It will be apparent, however, to one skilled in the art that the present disclosure may be practiced without these specific details. In other instances, well-known structures and devices are shown in block diagram form in order to avoid unnecessarily obscuring the present disclosure.

1. Phase-Encoded Detection Overview

Figure 1A:
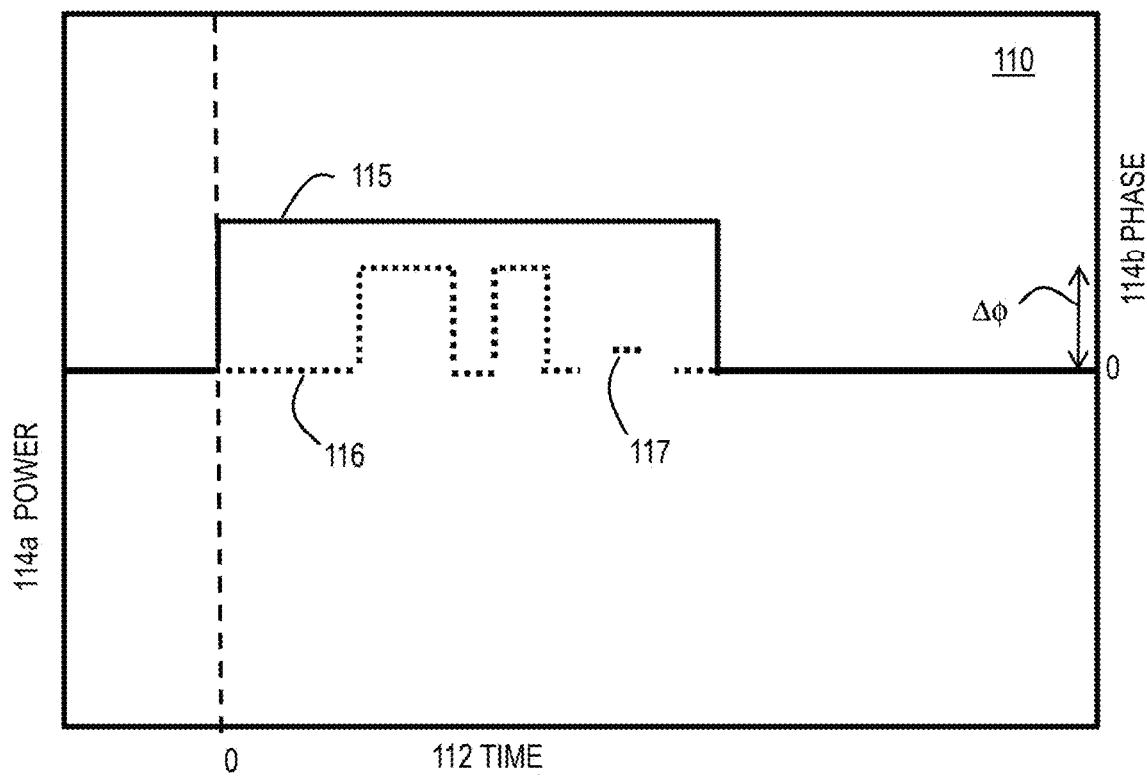
FIG. 1A is a schematic graph that illustrates an example transmitted optical phase-encoded signal for measurement of range, according to an implementation.

FIG. 1A is a schematic graph 110 that illustrates an example transmitted optical phase-encoded signal for measurement of range, according to an implementation. The horizontal axis 112 indicates time in arbitrary units from a start time at zero. The left vertical axis 114a indicates power in arbitrary units during a transmitted signal; and, the right vertical axis 114b indicates phase of the transmitted signal in arbitrary units. To most simply illustrate the technology of phase-encoded LIDAR, binary phase encoding is demonstrated. Trace 115 indicates the power relative to the left axis 114a and is constant during the transmitted signal and falls to zero outside the transmitted signal. Dotted trace 116 indicates phase of the signal relative to a continuous wave signal.

As can be seen, the trace is in phase with a carrier (phase=0) for part of the transmitted signal and then changes by $\Delta\phi$ (phase=$\Delta\phi$) for short time intervals, switching back and forth between the two phase values repeatedly over the transmitted signal as indicated by the ellipsis 117. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi*\{0, 1, 2$ and $3\}$, which, for $\Delta\phi=\pi/2$ (90 degrees), equals $\{0, \pi/2, \pi$ and $3\phi/2\}$, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave) as illustrated in FIG. 1A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (it is a non-coherent scheme).

For optical ranging applications, the carrier frequency is an optical frequency fc and a RF $f_0$ is modulated onto the optical carrier. The number N and duration $\tau$ of symbols are selected to achieve the desired range accuracy and resolution. The pattern of symbols is selected to be distinguishable from other sources of coded signals and noise. Thus a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figure 1B:
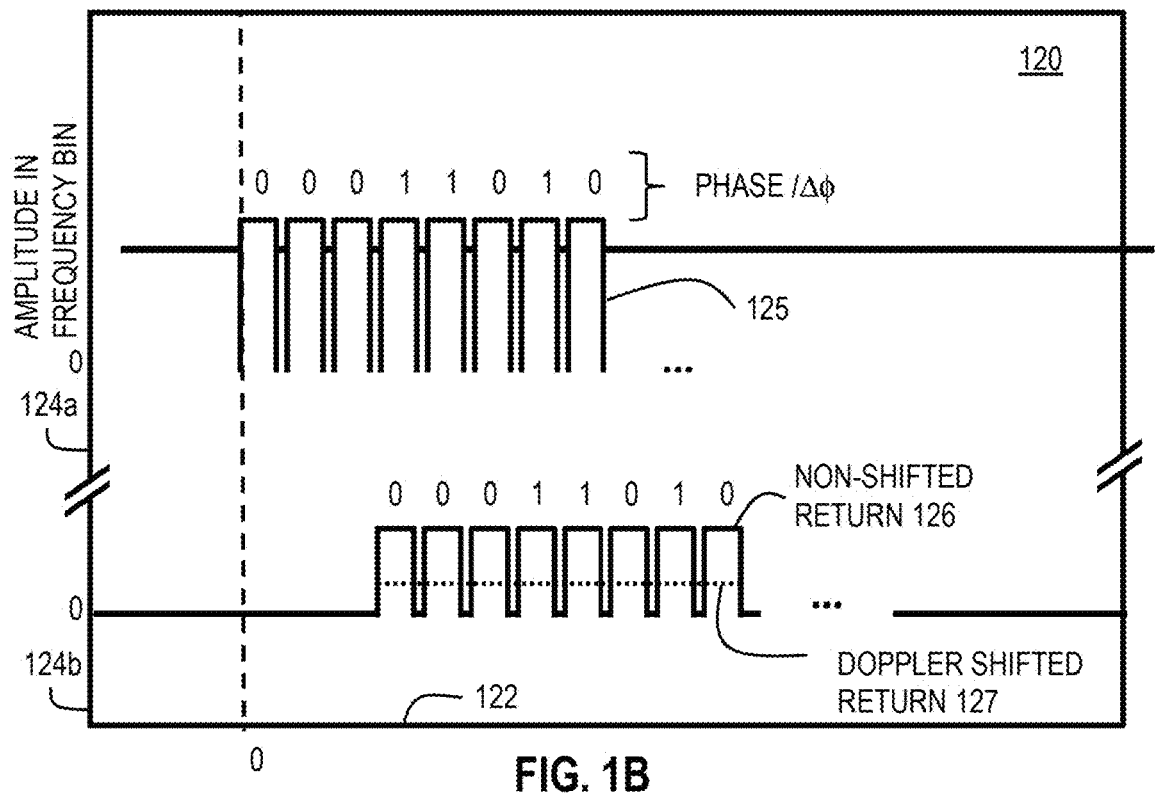
FIG. 1B is a schematic graph that illustrates the example transmitted signal of FIG. 1A as a series of binary digits along with returned optical signals for measurement of range, according to an implementation.

FIG. 1B is a schematic graph 120 that illustrates the example transmitted signal of FIG. 1A as a series of binary digits along with returned optical signals for measurement of range, according to an implementation. The horizontal axis 122 indicates time in arbitrary units after a start time at zero. The vertical axis 124a indicates amplitude of an optical transmitted signal at frequency $f_c+f_0$ in arbitrary units relative to zero. The vertical axis 124b indicates amplitude of an optical returned signal at frequency $f_c+f_0$ in arbitrary units relative to zero, and is offset from axis 124a to separate traces. Trace 125 represents a transmitted signal of M*N binary symbols, with phase changes as shown in FIG. 1A to produce (e.g., generate, create, etc.) a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency $f_c+f_0$ and is not well detected in the expected frequency band, so the amplitude is diminished.

The observed frequency f' of the return differs from the correct frequency $f=f_c+f_0$ of the return by the Doppler effect given by Equation 1.

$$f' = \frac{(c + v_o)}{(c + v_s)} f; \tag{1}$$

where c is the speed of light in the medium. Note that the two frequencies are the same if the observer and source are moving at the same speed in the same direction on the vector between the two. The difference between the two frequencies, $\Delta f=f'-f$, is the Doppler shift, $\Delta f_D$, which causes problems for the range measurement, and is given by Equation 2.

$$\Delta f_D = \left[\frac{(c + v_o)}{(c + v_s)} - 1\right] f \tag{2}$$

Note that the magnitude of the error increases with the frequency f of the signal. Note also that for a stationary LIDAR system ($v_0=0$), for an object moving at 10 meters a second ($v_0=10$), and visible light of frequency about 500 THz, then the size of the error is on the order of 16 megahertz (MHz, 1 MHz=$10^6$ hertz, Hz, 1 Hz=1 cycle per second). In various implementations described below, the Doppler shift error is detected and used to process the data for the calculation of range.

Figure 1C:
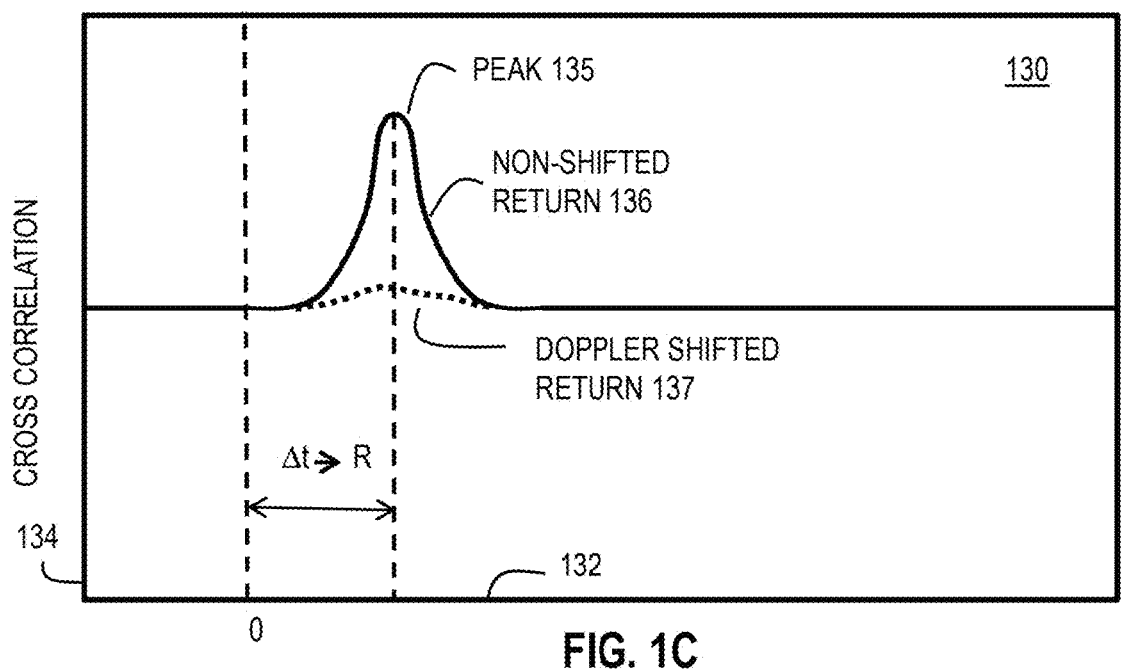
FIG. 1C is a schematic graph that illustrates example cross-correlations of a reference signal with two returned signals, according to an implementation.

FIG. 1C is a schematic graph 130 that illustrates example cross-correlations of the transmitted signal with two returned signals, according to an implementation. In phase coded ranging, the arrival of the phase coded reflection is detected in the return by cross correlating the transmitted signal or other reference signal with the returned signal, implemented practically by cross correlating the code for a RF signal with an electrical signal from an optical detector using heterodyne detection and thus down-mixing back to the RF band. The horizontal axis 132 indicates a lag time in arbitrary units applied to the coded signal before performing the cross correlation calculation with the returned signal. The vertical axis 134 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each the two traces followed by an inverse Fourier transform. Efficient hardware and software implementations for a Fast Fourier transform (FFT) are widely available for both forward and inverse Fourier transforms. More precise mathematical expression for performing the cross correlation are provided for some example implementations, below.

Note that the cross-correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 136 represents cross correlation with an idealized (noiseless) return signal that is reflected from an object that is not moving (and thus the return is not Doppler shifted). A peak occurs at a time Δt after the start of the transmitted signal. This indicates that the returned signal includes a version of the transmitted phase code beginning at the time Δt. The range R to the reflecting (or backscattering) object is computed from the two way travel time delay based on the speed of light c in the medium, as given by Equation 3.

$$R=c*\Delta t/2 \quad (3)$$

Dotted trace 137 represents cross correlation with an idealized (noiseless) return signal that is scattered from an object that is moving (and thus the return is Doppler shifted). The return signal does not include the phase encoding in the proper frequency bin, the correlation stays low for all time lags, and a peak is not as readily detected. Thus Δt is not as readily determined, and range R is not as readily produced.

Figure 1D:
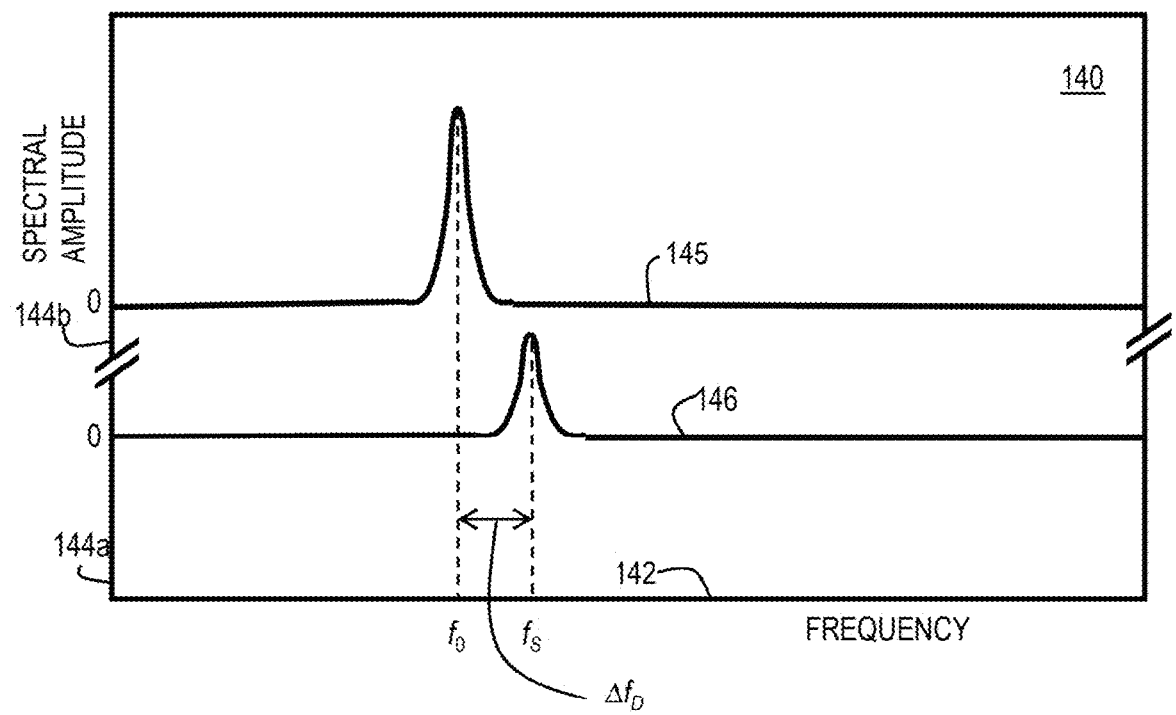
FIG. 1D is a schematic graph that illustrates an example spectrum of the reference signal and an example spectrum of a Doppler shifted return signal, according to an implementation.

According to various implementations, the Doppler shift is determined in the electrical processing of the returned signal; and the Doppler shift is used to correct the cross-correlation calculation. Thus, a peak is more readily found; and, range can be more readily determined. FIG. 1D is a schematic graph 140 that illustrates an example spectrum of the transmitted signal and an example spectrum of a Doppler shifted return signal, according to an implementation. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density, in arbitrary units relative to zero, and is offset from axis 144a to separate traces. Trace 145 represents a transmitted signal; and, a peak occurs at the proper RF $f_0$. Trace 146 represents an idealized (noiseless) return signal that is backscatter from an object that is moving and is therefore Doppler shifted. The return does not have a peak at the proper RF $f_0$; but, instead, is blue shifted by $\Delta f_D$ to a shifted frequency $f_S$.

Figure 1E:
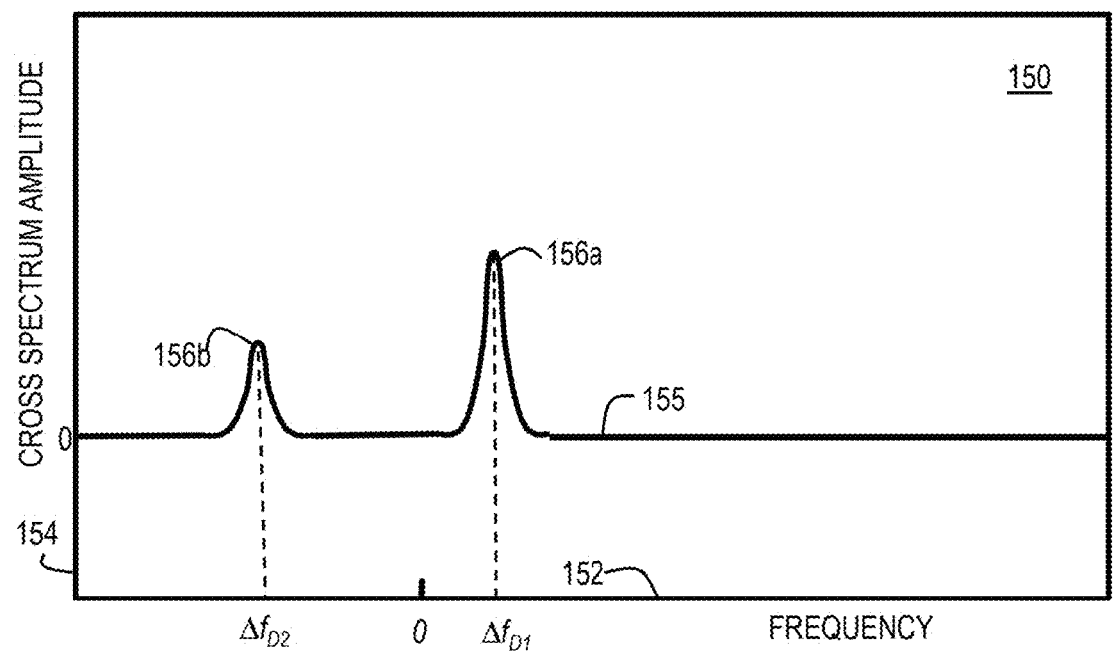
FIG. 1E is a schematic graph that illustrates an example cross-spectrum of phase components of a Doppler shifted return signal, according to an implementation.

In some Doppler compensation implementations, rather than finding $\Delta \eta_D$ by taking the spectrum of both transmitted and returned signals and searching for peaks in each, then subtracting the frequencies of corresponding peaks, as illustrated in FIG. 1D, it is more efficient to take the cross-spectrum of the in-phase and quadrature component of the down-mixed returned signal in the RF band. FIG. 1E is a schematic graph 150 that illustrates an example cross-spectrum, according to an implementation. The horizontal axis 152 indicates frequency shift in arbitrary units relative to the reference spectrum; and, the vertical axis 154 indicates amplitude of the cross-spectrum in arbitrary units relative to zero. Trace 155 represents a cross spectrum with an idealized (noiseless) return signal generated by one object moving toward the LIDAR system (blue shift of $\Delta f_{D1}=\Delta f_D$ in FIG. 1D) and a second object moving away from the LIDAR system (red shift of $\Delta f_{D2}$). A peak occurs when one of the components is blue shifted $\Delta f_{D1}$; and, another peak occurs when one of the components is red shifted $\Delta f_{D2}$. Thus, the Doppler shifts are determined. These shifts can be used to determine a velocity of approach of objects in the vicinity of the LIDAR, as can be critical for collision avoidance applications.

As described in more detail below, the Doppler shift(s) detected in the cross spectrum are used to correct the cross correlation so that the peak 135 is apparent in the Doppler compensated Doppler shifted return at lag Δt, and range R can be determined. The information needed to determine and compensate for Doppler shifts is either not collected or not used in prior phase-encoded LIDAR systems.

2. Optical Phase-Encoded Detection Hardware Overview

Figure 2:
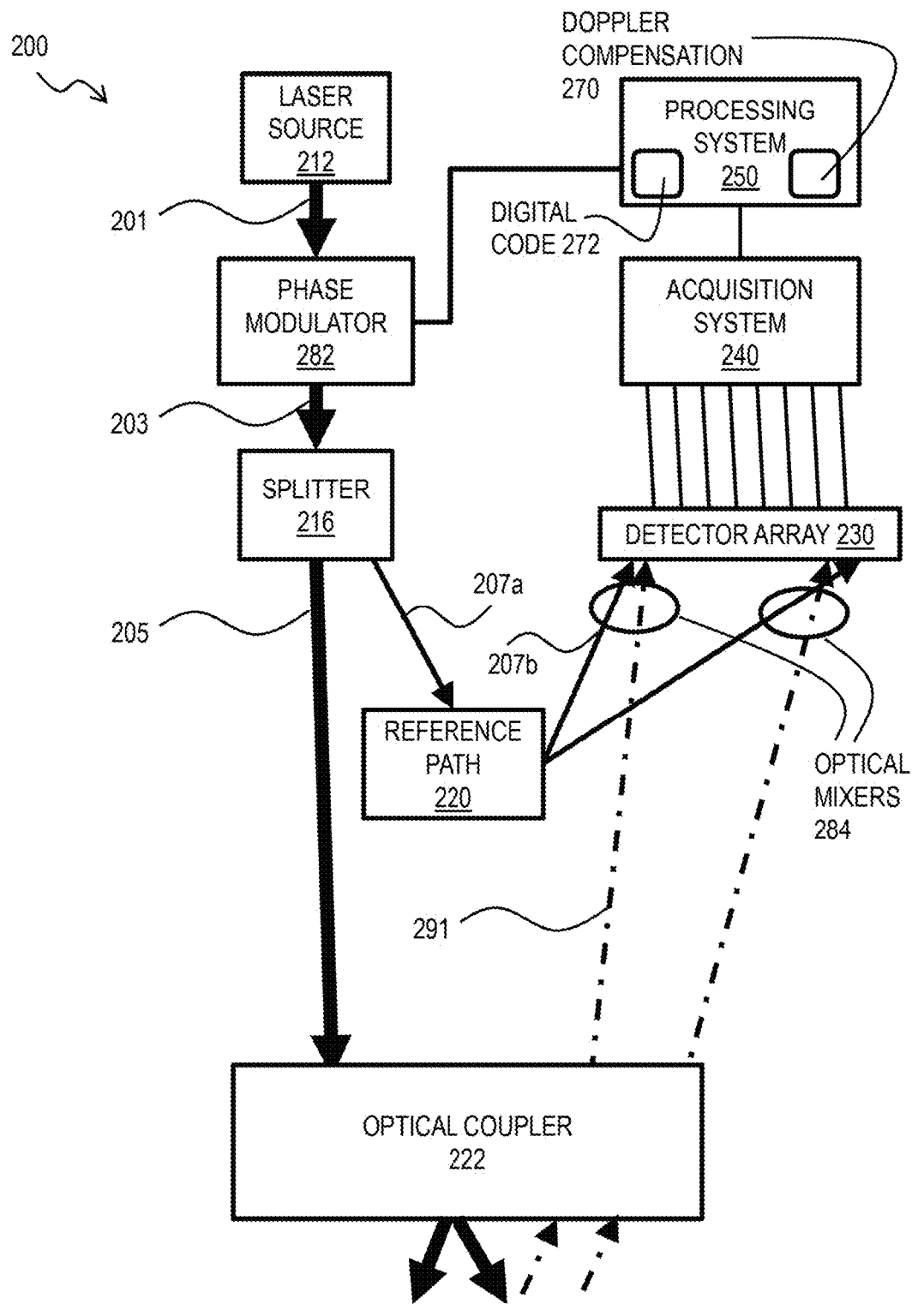
FIG. 2 is a block diagram that illustrates example components of a high resolution LIDAR system, according to an implementation.

In order to depict how a phase-encoded detection approach is implemented, some generic and specific hardware approaches are described. FIG. 2 is a block diagram that illustrates example components of a Doppler compensated LIDAR system, according to an implementation. The LIDAR system 200 includes a laser source 212, a splitter 216, a modulator 282a, a reference path 220, scanning optics 218, a processing system 250, an acquisition system 240, and a detector array 230. The laser source 212 emits a carrier wave 201 that is phase modulated in phase modulator 282 to produce a phase coded optical signal 203 that has a symbol length M*N and a duration D=M*N*τ. In some implementations, the phase encoding is controlled by a digital code module 271 in a processing system 250. A splitter 216 splits the optical signal into a target beam 205, also called transmitted signal herein, with most of the energy of the beam 203 and a reference beam 207a with a much smaller amount of energy that is nonetheless enough to produce good mixing with the returned beam 291 scattered from an object (not shown). In some implementations, the splitter 216 is placed upstream of the phase modulator 282. The reference beam 207a passes through reference path 220 and is directed to one or more detectors as reference beam 207b.

In some implementations, the reference path 220 introduces a known delay sufficient for reference beam 207b to arrive at the detector array 230 with the scattered light. In some implementations the reference beam 207b is called the local oscillator (LO) signal referring to older approaches that produced the reference beam 207b locally from a separate oscillator. In various implementations, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some implementations, the object is close enough and the transmitted duration long enough that the returns sufficiently overlap the reference signal without a delay. In some implementations, a separate laser source is used for the reference beam (local oscillator, LO) instead of using a beam split from the phase modulated beam by splitter 216.

The detector array is a single paired or unpaired detector or a 1-dimensional (1D) or 2-dimensional (2D) array of paired or unpaired detectors arranged in a plane roughly perpendicular to returned beams 291 from the object. The reference beam 207b and returned beam 291 are combined in zero or more optical mixers to produce an optical signal of characteristics to be properly detected. The phase or amplitude of the interference pattern, or some combination, is recorded by acquisition system 240 for each detector at multiple times during the signal duration D. The number of temporal samples per signal duration affects the down-range extent. The number is often a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the unique code before it repeats (for unambiguous ranging). This is enabled as any digital record of the returned bits could be cross correlated with any portion of transmitted bits from the prior transmission history.

The acquired data is made available to a processing system 250, such as a computer system described below with reference to FIG. 15, or a chip set described below with reference to FIG. 15. The processing system 250 includes a Doppler compensation module 270a and a phase tracking internal reflection subtraction module 270b (shown in FIG. 2 as an internal reflection subtraction module 270b). The Doppler compensation module 270a determines the size of the Doppler shift and the corrected range based thereon along with any other corrections described herein. The internal reflection subtraction module 270b determines the phase tracked internal reflection correction used by the processing system 250 along with any other corrections known to provide a corrected range measurement (e.g., signals produced from Doppler compensation module 270a). In some embodiments, the data processing also provides estimates of Doppler shift in which the frequency of a return signal is shifted due to motion of the object.

Any known apparatus or system may be used to implement the laser source 212, phase modulator 282, beam splitter 216, reference path 220, optical mixers 284, detector array 230, or acquisition system 240. Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

2.1. Phase Encoded Optical Detection

In some implementations, electro-optic modulators provide the modulation for phase modulator 282. The system is configured to produce a phase code of length M*N and symbol duration τ, suitable for the down-range resolution desired. For example, in 3D imaging applications, the total number of pulses M*N is in a range from about 500 to about 4000. Because the processing is done in the digital domain, it is advantageous to select M*N or N as a power of 2, e.g., in an interval from 512 to 4096. M is 1 when no averaging is done. If there are random noise contributions, then it is advantages for M to be about 10. As a result, N is in a range from 512 to 4096 for M=1 and in a range from about 50 to about 400 for M=10. For a 500 megabits per second (Mbps, 1 Mbps=1*$10^6$ bits per second) to 1 gigabits per second (Gbps, 1 Gbps=1*$10^9$ bits per second) baud rate, the time duration of these codes is then between about 500 ns and 8 microseconds. It is noted that the range window can be made to extend to several kilometers under these conditions and that the Doppler resolution can also be quite high (depending on the duration of the transmitted signal). Although processes, equipment, and data structures are depicted in FIG. 2 as integral blocks in a particular arrangement for purposes of illustration, in other implementations one or more processes or data structures, or portions thereof, are arranged in a different manner, on the same or different hosts, in one or more databases, or are omitted, or one or more different processes or data structures are included on the same or different hosts. For example, splitter 216 and reference path 220 include zero or more optical couplers.

In electrical engineering, a sinusoid with phase modulation (corresponding to an angle modulation between the real and imaginary parts of the mathematical function exp(iωt)) can be decomposed into, or synthesized from, two amplitude-modulated sinusoids that are offset in phase by one-quarter cycle (π/2 radians). All three functions have the same frequency. The amplitude modulated sinusoids are known as in-phase component (I) at 0 phase and quadrature component (Q) at a phase of π/2. A laser 310 produces an optical signal at a carrier frequency fc. The laser optical signal, L, is represented mathematically by Equation 4.

$$L = I_0 \exp(i\omega t) \tag{4}$$

where $I_0$ is the intensity output by the laser, exp( ) is the exponential function such that exp(x)=$e^x$, i is the imaginary number having the properties of the square root of −1, t is time, and ω=2πfc is the angular frequency corresponding to the optical carrier frequency fc. Mathematically this expression has a real part=$I_{0R}$ cos(ωt) and an imaginary part=$I_{0I}$ sin(ωt), where $I_{0R}$ is the real part of the intensity (in-phase) and $I_{0I}$ is the imaginary part. The phase of the oscillation is given by the angle between the real and imaginary parts. Thus, L=$I_{0R}$ cos(ωt)+i $I_{0I}$ sin(ωt), and $I_0$ is the root of the sum of the squares of the real and imaginary parts, $I_0^2$=$I_{0R}^2$+$I_{0I}^2$. Splitter 216 directs a small portion of the intensity of the signal to use as a reference signal (called a local oscillator) LO given by Equation 5.

$$LO = A_{LO} \exp(i\omega t) = A_R \cos(\omega t) + A_I \sin(\omega t). \tag{5a}$$

where A is a constant that represents the intensity effect of the beam splitter 216. The electric field, $E_{LO}$, can thus be written as Equation 5b.

$$E_{LO} = A_{LO} e^{i\omega t} \tag{5b}$$

When the reference signal (LO) is the unmodulated laser signal (e.g., the splitter 216 is before phase modulator 282), the entire signal is in phase and the imaginary component is zero, thus $$LO = A\cos(\omega t). \tag{5c}$$

The digital code module 272 in the processing system 250 sends an electrical signal that indicates a digital code of symbols to be imposed as phase changes on the optical carrier, represented as B(t) where B(t) switches between 0 and π/2 as a function of t. For example, the phase modulator 282 imposes the phase changes on the optical carrier by taking digital lines out of a field programmable gate array (FPGA), amplifying them, and driving the electro-optic modulator (EOM, which is an optical device capable of imposing modulation on phase, frequency, amplitude, and/or a polarization of a beam). The transmitted optical signal, T, is then given by Equation 6.

$$T = C\exp(i[\omega t + B(t)]) \tag{6}$$

where C is a constant that accounts for the reduction in Jo by splitting of the fraction A and any amplification or further reduction imposed by the phase modulator 282.

Any phase modulator may be used as modulator 282. For example, an electro-optic modulator (EOM) is used that includes a crystal, such as lithium niobate, whose refractive index is a function of the strength of the local electric field. That means that if lithium niobate is exposed to an electric field, light will travel more slowly through it. But the phase of the light leaving the crystal is directly proportional to the length of time it takes that light to pass through it. Therefore, the phase of the laser light exiting an EOM can be controlled by changing the electric field in the crystal according to the digital code provided by the digital code module 272. The phase change induces a broadband frequency signal, with bandwidth B approximately equal to the baud rate, 1/τ.

The phase-encoded optical signal output by the phase modulator 282 is transmitted through some optical couplers 222, such as a polarizing beam splitter (PBS) or other circulator optics, and any scanning optics, after which it is scattered by any object in the beam carrying the transmitted signal. For example, it was found that the fiber coupled polarizing beam splitter combiners offer better isolation between the ports than the fiber-based circulators as an optical component of couplers 222. This is important in some implementations, because signal that is not well isolated between transmit and receive will appear as an undesirable large peak in the range profiles. So, in some implementations, the transmit signal is injected into port 1, is emitted out of port 2 and the back-scattered return signal is received in port 2 and exits port 3. Some targets (e.g., metal targets) maintain the polarization of the beam and some targets (e.g., diffuse targets) de-polarize the returned beam. In some implementations, a quarter wave plate is included in the transmit optics to properly compensate for targets that do not depolarize.

The returned signal 291 is directed by the optical coupler 222, e.g., a PBS, to the optical mixer 284 where the return optical signal 291 is mixed with the reference optical signal (LO) 207b given by Equation 5. The returned signal R from the kth object intercepted by the transmitted beam is given by Equation 7a.

$$R_k = A_k \exp(i[(\omega + \omega_{Dk})(t + \Delta t_k) + B(t + \Delta t_k)]) \tag{7a}$$

where $A_k$ is a constant accounting for the loss of intensity due to propagation to and from the object and scattering at the kth object, $\Delta t_k$ is the two way travel time between the LIDAR system and the kth object, and $\omega_{Dk} = 2\pi \Delta f_D$ is the angular frequency of the Doppler frequency shift (called Doppler shift herein for convenience) of the kth object. The electric field of the return signal, $E_R$, summed over all targets, is then given by Equation 7b.

$$E_R = \Sigma_k A_k e^{i[\omega(t + \Delta t_k) + \omega_{Dk}(t + \Delta t_k) + B(t + \Delta t_k)]} \tag{7b}$$

The coincident signals 291 and 207b at the optical mixer 284 produce a mixed optical signal with a beat frequency related to a difference in frequency and phase and amplitude of the two optical signals being mixed, and an output depending on the function of the optical mixer 284. As used herein, down mixing refers to optical heterodyne detection, which is the implementation of heterodyne detection principle using a nonlinear optical process. In optical heterodyne detection, called "down-mixing" herein, an optical signal of interest at some optical frequency is non-linearly mixed with a reference "local oscillator" (LO) that is set at a close-by frequency. The desired outcome is a difference frequency, which carries the information (amplitude, phase, and frequency modulation) of the original optical frequency signal, but is oscillating at a lower more easily processed frequency, called a beat frequency herein, conveniently in the RF band. In some implementations, this beat frequency is in an RF band that can be output from the optical detector 230 as an electrical signal, such as an electrical analog signal that can be easily digitized by RF analog to digital converters (ADCs) within acquisition system 240. The digital electrical signal is input to the processing system 250 and used, along with the digital code from module 272, by the Doppler compensation module 270 to determine cross-correlation and range, and, in some implementations, the speed and Doppler shift.

In some implementations, the raw signals are processed to find the Doppler peak and that frequency, $\omega_D$, is used to correct the correlation computation and determine the correct range. This is often accomplished with an autocorrelation computation, e.g. using the computational efficiencies of a FFT and inverse FFT. The ambiguity in sign of the Doppler shift is tolerated or resolved using some scoring algorithm, such as described in previous work.

In other implementations, it was discovered to be advantageous if the optical mixer and processing are configured to determine the in-phase and quadrature components, and to use that separation to first estimate $\omega_D$ and then use COD to correct the cross-correlation computation to derive $\Delta t$. The value of $\omega_D$ is also used to present the along ray speed of the object. The value of $\Delta t$ is then used to determine and present the range to the object using Equation 3 described above. The separation of the I and Q signals by the optical mixers enable clearly determining the sign of the Doppler shift, as described in international patent application PCT/US2018/016632 published on 9 Aug. 2018 as WO 2018/144853, the entire contents of which are hereby incorporated by reference as if fully set forth herein.

In some implementations the optical mixer 284 includes a 90 degree Hybrid optical mixer in which the return optical signal 291 is mixed with the reference optical signal (LO) 207b given by Equation 5b. The returned signal R is given by Equation 7a. The Hybrid mixer outputs four optical signals, termed I+, I−, Q+, and Q−, respectively, combining LO with an in-phase component of the return signal R, designated $R_I$, and quadrature component of the return signal R, designated $R_Q$, as defined in Equation 8a through 8d.

$$I+=LO+R_I \tag{8a}$$

$$I-=LO-R_I \tag{8b}$$

$$Q+=LO+R_Q \tag{8c}$$

$$Q-=LO-R_Q \tag{8d}$$

where $R_I$ is the in phase coherent cross term of the AC component of the return signal R and $R_Q$ is the 90 degree out of phase coherent cross term of the AC component of the return signal R. For example, the electrical field of the above relations can be expressed based on Equations 5b and Equation 7b above and Equation 8e through Equation 8g below to produce Equations 8h through Equation 8k.

$$LO=|E_{LO}|^2 \tag{8e}$$

$$R_I=|E_R|^2+\text{Real}(E_R E^*_{LO}) \tag{8f}$$

$$R_Q=|E_R|^2+\text{Imag}(E_R E^*_{LO}) \tag{8g}$$

where * indicate a complex conjugate of a complex number, Imag( ) is a function that returns the imaginary part of a complex number, and Real( ) is a function that returns the real part of a complex number. The AC term $E_R E^*_{LO}$ cancels all of the optical frequency portion of the signal, leaving only the RF "beating" of LO with the RF portion of the return signal—in this case the Doppler shift and code function. The terms $|E_{LO}|^2$ and $|E_R|^2$ are constant (direct current, DC) terms. The latter is negligible relative to the former; so the latter term is neglected in the combinations expressed in Equations 8h through Equation 8k, as particular forms of Equation 8a through Equation 8d.

$$I+=|E_{LO}|^2+\text{Real}(E_R E^*_{LO}) \tag{8h}$$

$$I-=|E_{LO}|^2-\text{Real}(E_R E^*_{LO}) \tag{8i}$$

$$Q+=|E_{LO}|^2+\text{Imag}(E_R E^*_{LO}) \tag{8j}$$

$$Q-=|E_{LO}|^2-\text{Imag}(E_R E^*_{LO}) \tag{8k}$$

The two in-phase components I+ and I− are combined at a balanced detector pair to produce the RF electrical signal I on channel 1 (Ch1) and the two quadrature components Q+ and Q− are combined at a second balanced detector pair to produce the RF electrical signal Q on channel 2 (Ch2), according to Equations 9a and 9b.

$$I=I+-I- \tag{9a}$$

$$Q=Q+-Q- \tag{9b}$$

The use of a balanced detector (with a balanced pair of optical detectors) provides an advantage of cancellation of common mode noise, which provides reliable measurements with high signal to noise ratio (SNR). In some implementations, such common mode noise is negligible or otherwise not of concern; so, a simple optical detector or unbalanced pair is used instead of a balanced pair. The Doppler compensation module 270 then uses the signals I and Q to determine one or more Doppler shifts $\omega_D$, with corresponding speeds, and then uses the value of $\omega_D$ and the values of B(t) from the digital code module 272 and the signals I and Q to produce a corrected correlation trace in which peaks indicate one or more Δt at each of the one or more speeds. When multiple speeds are detected, each is associated with a peak in the corresponding multiple correlation traces. In some implementations, this is done by coincidence processing, to determine which current speed/location pairing is most probably related to previous pairings of similar speed/location. The one or more Δt are then used to determine one or more ranges using Equation 3, described above.

It is advantageous to prepare a frequency domain representation of the code used for correlation at the start and re-used for each measuring point in the scan; so, this is done in some implementations. A long code, of duration D=(M*N)*τ, is encoded onto the transmitted light, and a return signal of the same length in time is collected by the data acquisition electronics 240. Both the code and signal are broken into M shorter blocks of length N so that the correlation can be conducted several times on the same data stream and the results averaged to improve signal to noise ratio (SNR). Each block of N symbols is distinctive from a different block of N symbols and therefore each block is an independent measurement. Thus, averaging reduces the noise in the return signal. The input I/Q signals are separated in phase by π/2. In some implementations, further averaging is done over several illuminated spots in order to remove the effect of reflections from purely internal optics.

Families of good binary spreading sequences with minimal auto-correlation sidelobes for communication systems and radar and LIDAR systems such as the so-called "maximal-length sequences (m-sequences)" are known to exist to provide the codes used for phase modulation of each block of the M blocks. For the m-sequences, lists of all possible m-sequences which are derived from primitive (irreducible) polynomials of relatively short length (i.e., $n=2^Z-1$ where Z<11) have been published as R. Church, "Tables of Irreducible Polynomials for the First Four Prime Moduli," Annals of Mathematics, vol. 36, no. 1, pp. 198-209, 1935 (Church hereinafter). The primitive polynomials and the m-sequences derived from them can be defined by taps of a linear feedback shift register. As a result, these m-sequences do not have lengths that are powers of 2.

Figure 3:
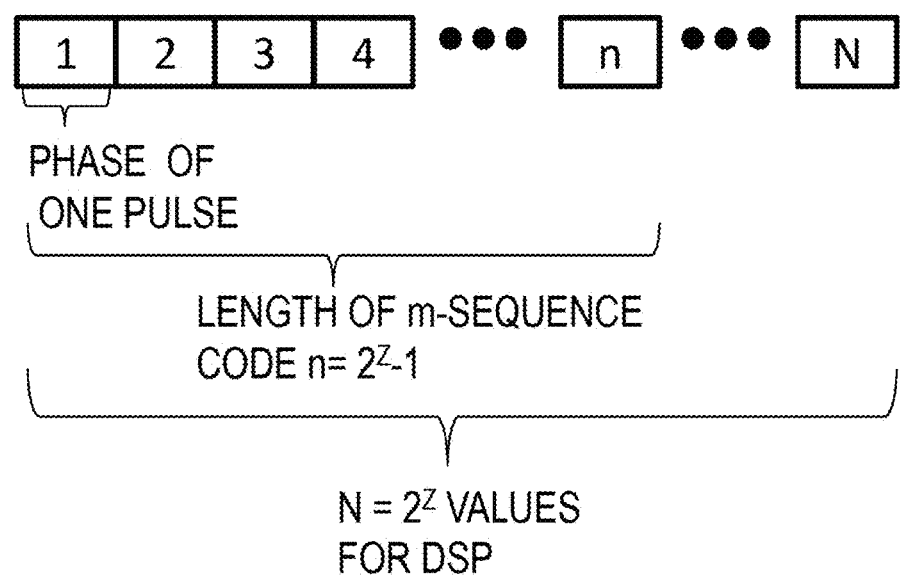
FIG. 3 is a block diagram that illustrates an example difference between an m-sequence code and a practical code for digital signal processing (DSP), according to an implementation.

However, use of power of 2 length Fast Fourier Transforms (FFT's) is highly beneficial for computational cost and implementation in real-time processing hardware such as FPGA. This means that true $n=2^Z-1$ length codes are typically not used, and in fact the codes are padded by one or more extra-symbols to make them a length N that is a power of 2. FIG. 3 is a block diagram that illustrates an example difference between an m-sequence code and a practical code for digital signal processing (DSP), according to an implementation. Each numbered box represents one phase symbol (baud). The ideal m-sequence ends at symbol $n=2^Z-1$, but a typical practical code for use with DSP equipment has length N that is a power of two and ends at least one symbol later, represented by symbol N separated from symbol n by zero or more intervening symbols indicated by ellipses.

Figures 4A, 4B:
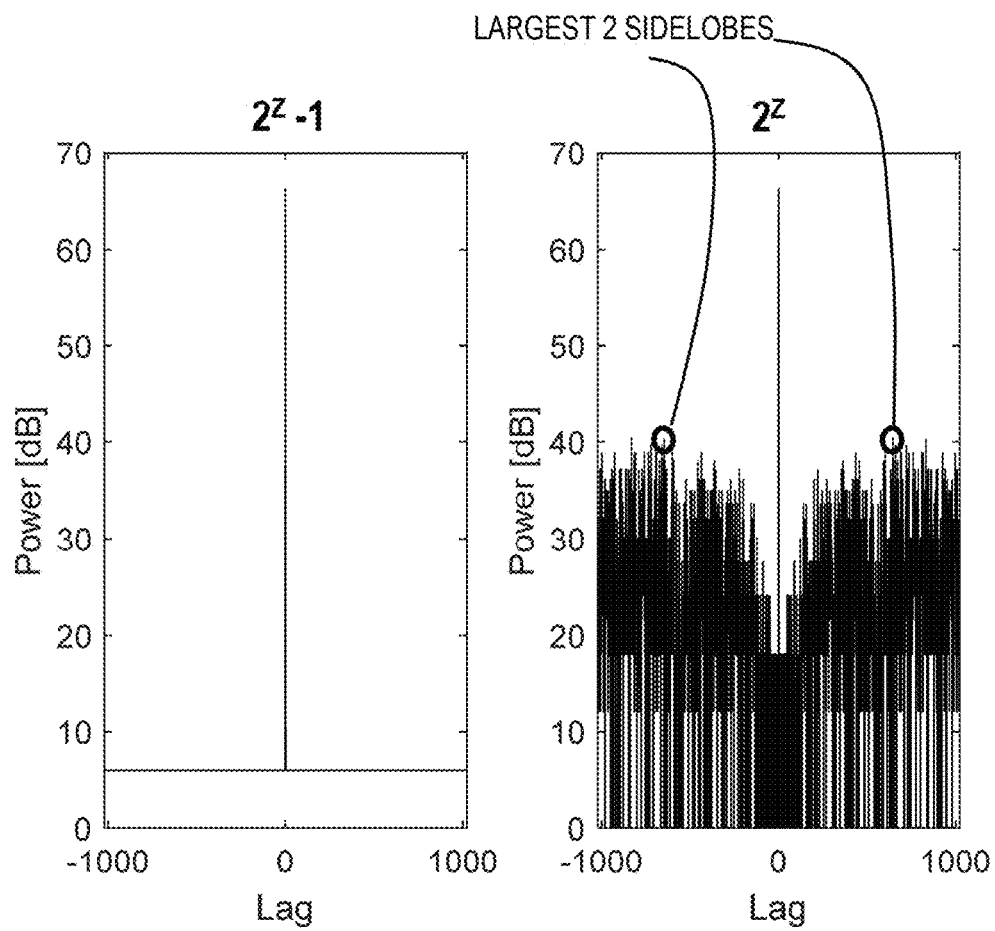
FIG. 4A is a graph that illustrates an example autocorrelation of an m-sequence code without padding, used in some implementations.
FIG. 4B is a graph that illustrates an example autocorrelation of an m-sequence code with padding, used in some implementations.

This padding leads to larger sidelobe levels away from a peak in its autocorrelation, with similar results expected during cross-correlations used during Doppler processing described above. FIG. 4A is a graph that illustrates an example autocorrelation of an m-sequence code without padding, used in some implementations. The horizontal axis indicates lag in number of samples; and, the vertical axis indicates power in decibels (dB, 1 dB=½ $\log_{10}$ [100*reference power/reference power]) relative to an arbitrary reference power. Autocorrelation is computed for a $2^Z-1$ length m-sequence, Z=10 (corresponding to taps=11110001101 in Church), so n=1023. Here the sequence has been up-sampled by a factor of 2 to length 2046 samples, two short of the 2048 that is a power of two. The autocorrelation was computed without benefit of the efficiencies of DSP. The ideal autocorrelation from such an m-sequence consists of a single peak with correlation amplitude of $2^Z$ at lag=0, and an amplitude of −1 for all other lags. Note the computed autocorrelation peak stands at about 68 dB, which is above a level noise floor at about 8 dB. This low and level noise level offers a significant benefit in minimizing autocorrelation range and Doppler sidelobe errors.

FIG. 4B is a graph that illustrates an example autocorrelation of an m-sequence with padding, used in some implementations. The horizontal axis indicates lag in number of samples; and, the vertical axis indicates power in decibels. Autocorrelation is of same m-sequence that has been padded with two extra bits to make the sequence 2048 samples long, which is a power of 2 for efficient FFT processing. Here the 0 lag position has been placed in the center of the plot window for clarity. Various sidelobe peaks arise, just as mathematical artifacts. Two largest sidelobes are indicated by circles. These largest sidelobes have peak power of almost 40 dB at apparent lags greater than 500 and less than −500 samples.

In practice, no real system is perfect; and, non-idealities such as sub-sample shifts, analog filtering of amplifiers and modulators, non-integer Doppler shifts, etc. cause the sidelobes to rise in power and change in apparent lag.

3. Techniques to Reduce Sidelobes

Several approaches are described herein that can be used to reduce the effects of spurious sidelobes in phase-encoded high resolution Doppler LIDAR. These techniques can be used separately or in any combination, in various implementations.

3.1 Fractional Clock Signals

In some implementations, $2^Z$ samples are collected in a delayed time interval of duration equal to the time that $2^Z-1$ symbols are transmitted. Thus, the sampling time is a fraction of the transmit pulse duration, τ and, consequently, the transmit pulse rate is a fraction of the sampling rate. This can be accomplished in a variety of ways.

In a hardware implementation, a clock signal driving a digital to analog converter (DAC) to provide the electrical signal sent to the phase modulator 216 is different from the clock signal driving the analog to digital converter (ADC) used to collect the electrical signal at the detector 230. This can be accomplished with a master clock pulse rate and a fractional-Z divider architecture. For example, the clock rate driving the ADC is fractionally divided down (e.g., stepping down) to generate the clock rate for the Tx generator in the ratio of $(2^Z-1)/2^Z$. The hardware components are shown in FIG. 5.

Figure 5:
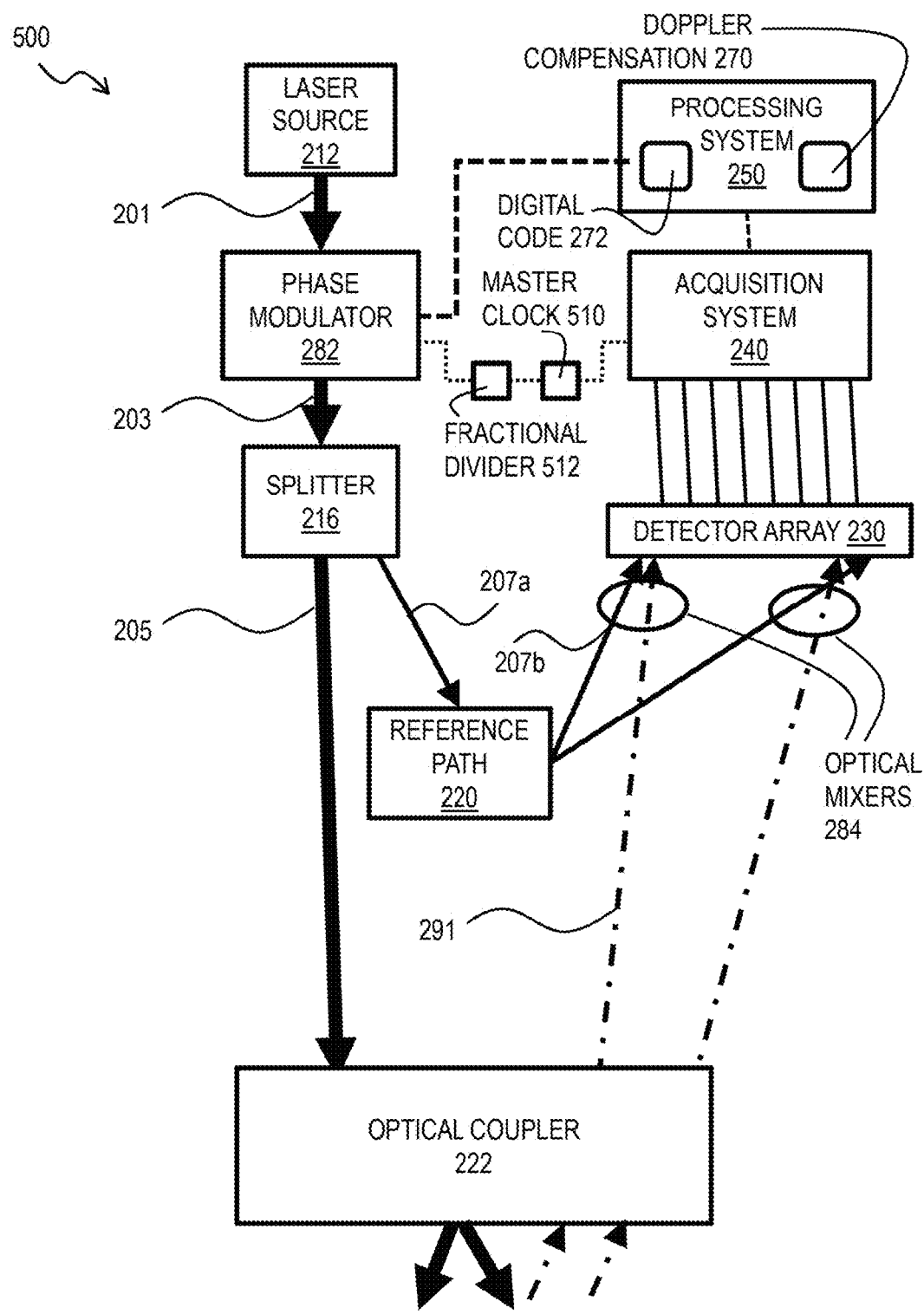
FIG. 5 is a block diagram that illustrates example components of a high resolution LIDAR system with fractional divider added to adjust clock signal from master clock, according to an implementation.

FIG. 5 is a block diagram that illustrates example components of a high resolution LIDAR system with fractional divider added to adjust (e.g., modify, change, stepping up, stepping down, etc.) clock signal from master clock, according to an implementation. Items 201 through 284 are as described above for FIG. 2. In this implementation a master clock 512 implicit in FIG. 2 is made explicit; and issues a clock signal indicated by a dotted line to the processing system. Also, analog electrical signals are indicated by solid non-arrow lines, while digital signals, such as the signal from acquisition system 240 to processing system 250, and from processing system to phase modulator 272 are indicated by dashed lines. In contrast to the components depicted in FIG. 2, a fractional divider 512 is added. This fractional divider 512 changes the clock signal input to the phase modulator 282, and a digital to analog converter (DCA, not shown) within the modulator 282.

3.2 Received Signal Interpolation

In these implementations, $2^Z-1$ samples (n=0, ..., $2^Z-2$) in the time domain of the received signal are interpolated to $2^Z$ points (called up-sampling with samples n'=0, ..., $2^Z-1$) before FFT processing to determine cross-correlation. Each received signal is interpolated to $2^Z$ points before the spectrum, or cross-correlation of real and imaginary parts, is computed using FFT processing. The first point and the last point are set, i.e., to the first received phase (sample 0) and the last received phase (sample $2^Z-2$), respectively. The remaining $2^Z-3$ points are interpolated using any interpolation procedure known in the art, such as linear interpolation or cubic spline interpolation among others. The time value of the n'th interpolated point is t' given by Equation 10.

$$t' = t(n') = \tau\frac{(2^Z - 1)}{2^Z}n' \tag{10}$$

In an example implementation, linear interpolation reduces the power in the sidelobes by about 20 dB, as illustrated in FIG. 6A through FIG. 6C.

FIG. 6A is a graph that illustrates an example autocorrelation of received signal based on a Z=11 m-sequence code (sequence #1, taps=10000000101 from Church), according to an implementation. The horizontal axis indicates range bin (equivalent to sample lag); and, the vertical axis indicates power relative to an arbitrary reference in dB. Because this is autocorrelation rather than cross correlation with the transmitted signal, the peak is at zero lag. The received signal is assumed to have zero or integer multiple of native frequency resolution of the system. The lags that have power of 0 dB represent where the autocorrelation was near perfect but with near equal numbers of +1 and −1 in the sum at that lag. As the sequence is odd, the correlation can never be zero, so 0 dB is the minimum power in the correlation. This is part of the ideal property of the m-sequences. At Z=11, there are 2047 symbols. The received signal is up-sampled by a factor of 2 so that there are 4094 samples (which is 2 less than 4096 that is power of two); and, the autocorrelation is computed using a digital Fourier transform (DFT) that uses some acceleration approaches but does not achieve the speed of the FFT that relies on a series that is a power of two. Note the lack of sidelobe peaks and low power (<10 dB) outside the peak at zero lag, characteristic of m-sequence codes.

The plots in FIG. 6A and following plots below, unless otherwise stated, are produced by simulation in MATLAB that consisted of generating the binary m-sequence C(t), up-sampling the sequence by a factor of L (e.g., by a facto using Dr of L=2, which corresponds to repeating each symbol twice), applying the sequence to a complex exponential representing a Doppler shifted IQ sampled signal as given by Equation 11.

$$V(t) = \exp\left[\frac{i\pi}{2}C(t) + 2\pi i f_{Dop}t\right]. \tag{11}$$

This time domain signal is transformed to the frequency domain using an FFT, multiplied by the conjugate of the FFT of C(t) that has been circularly shifted to compensate for the integer proportion of $f_{Dop}$, then inverse Fourier transformed with an IFFT to generate the "autocorrelation".

FIG. 6B is a graph that illustrates an example autocorrelation of received signal based on a Z=11 m-sequence code (#1 from Church) padded with zeros to a length of a power of two according to an implementation. The padding introduces sidelobes with spurious peaks at range bins of plus and minus 1000, and power levels over 35 dB, up over 25 dB from the ideal of FIG. 6A.

FIG. 6C is a graph that illustrates an example autocorrelation of received signal based on a Z=11 m-sequence code (#1 from Church) where the signal is linearly interpolated from 4094 samples to 4096 samples prior to FFT processing, according to an implementation. For the linearly interpolated plots, C(t) is not interpolated before being inserted into V(t) (as if the code is transmitted at 4094 samples) but V(t) and the C(t) that are correlated are linearly interpolated before being subjected to a FFT and multiplied in the frequency domain. As shown in FIG. 6C, the power of the sidelobe peaks are reduced by nearly 20 dB, much closer to the ideal of FIG. 6A but at the increased computational efficiency of power of two FFT processing.

FIG. 7A through FIG. 7C show processing similar to that in FIG. 6A through FIG. 6C, but for a received signal Doppler shifted a non-integer (3.05) multiple of the native frequency, according to an implementation. The sidelobe power levels rise in the precise processing depicted in FIG. 7A to almost 20 dB; but the sidelobe power does not rise substantially in the more efficient FFT processing of FIG. 7B and FIG. 7C compared to FIG. 6B and FIG. 6C, respectively. The interpolation performed to produce FIG. 7C is still superior (by about 15 dB) to the zero padding of FIG. 7B and close to the more precise processing of FIG. 7A.

FIG. 8A through FIG. 8C show processing similar to that in FIG. 6A through FIG. 6C, but for a received signal Doppler shifted a different non-integer (3.25) multiple of the native frequency, according to an implementation. The sidelobe power levels rise in the precise processing depicted in FIG. 7A to about 30 dB; but the sidelobe power does not rise substantially in the more efficient FFT processing of FIG. 7B compared to FIG. 6B, and remains about 35 dB. The interpolation performed to produce FIG. 8C is still superior (by about 5 dB) to the zero padding of FIG. 8B and close to the more precise processing of FIG. 8A.

3.3 Transmitted Signal Interpolation

In these implementations, interpolation is performed on the transmit path with sampling rate identical or at a harmonic of the ADC sampling rate of the acquisition system 240 to make the transmitted waveform periodic in $2^Z$ samples of the ADC, but more closely represent a m-sequence with $2^Z-1$ symbols. The $2^Z-1$ symbols of the m-sequence are up-sampled by a factor K so that for every binary symbol in the binary sequence, the symbol is repeated K times before the next symbol of the m-sequence is introduced. This up-sampled binary waveform is then filtered with a low-pass, digital filter having corner frequency near the sample rate of the ADC where only $2^Z$ samples are collected per code duration, rather than the $K*2^{Z-1}$ samples that are generated in the unfiltered sequence. This smoothed waveform (i.e., the output from the low-pass, digital filter) is then interpolated to generate $2^Z$ points from these $K(2^Z-1)$ filtered waveform points. This is the transmit path equivalent of the receive path interpolation described above.

In some implementations, this approach is implemented using a Digital-to-Analog Converter (DAC) between the digital code generator 272 in processor system 250 and the phase modulator 282, such that the DAC allows analog signal generation rather than simple binary signal generation.

3.4 Transmitted Signal Random Insertions

In these implementations, symbols are semi-randomly inserted in the up-sampled code, so that the inserted symbols do not change the correlation but do lengthen the sequence. As above, the $2^Z-1$ symbols of the m-sequence are up-sampled by a factor K so that for every binary symbol in the binary sequence, the symbol is repeated K times. In this implementation, the K repeats are output at a rate $K*f_{TX}$ that is K times faster than a native rate $f_{TX}$ of any analog-to-digital converter (ADC) otherwise used for resolving spatial and temporal spots with the LIDAR. For example, the DAC or the Tx output is operated at a faster rate, but effectively generate a slower rate code, i.e. $f_{TX}=1/\tau$ where $\tau$ is the shortest duration feature in the code sequence. K extra symbols are inserted semi-randomly to increase the length of the sequence from $K*(2^Z-1)$ to $K*2^Z$. The symbol inserted is not completely random because while the location of the insertion is random, there is only one insertion per $2^Z-1$ symbols and the value inserted preferably matches at least one of the symbols that are adjacent to the insertion point. This ensures that runs of symbols (repeated instances of the same symbol in the sequence) are not interrupted; but, only extended a small amount.

Some insertions are expected to result in better sidelobe performance that other choices of insertions. In some implementations, an exhaustive or non-exhaustive search for the best performing insertions is performed. After testing with real or simulated data, a selected sequence should very closely represent the $2^Z-1$ m-sequence but spread over $2^Z$ samples.

Figure 9A:
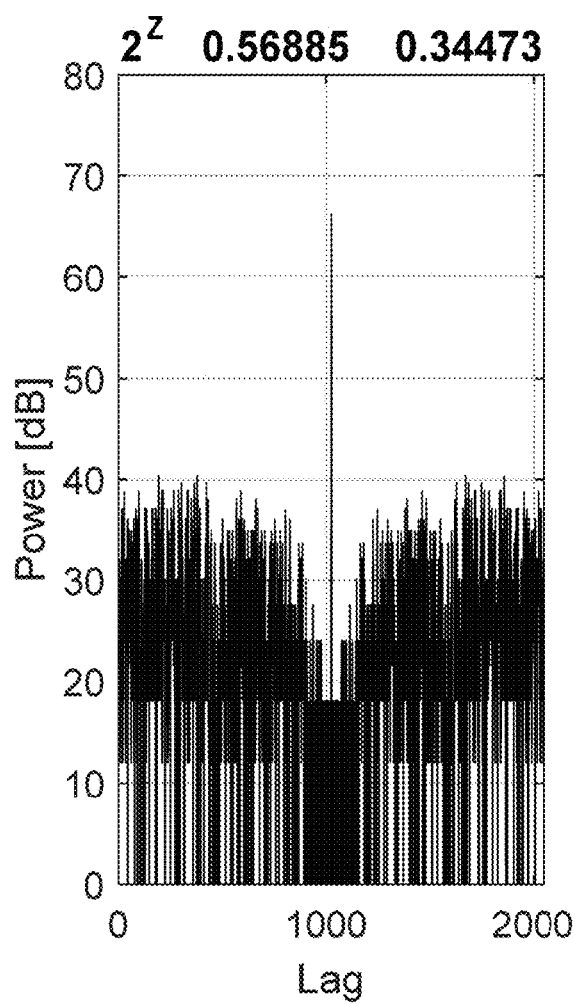
FIG. 9A and FIG. 9B are graphs that illustrate example sidelobe reduction achieved by semi-random insertions, according to an implementation.
Figure 9B:
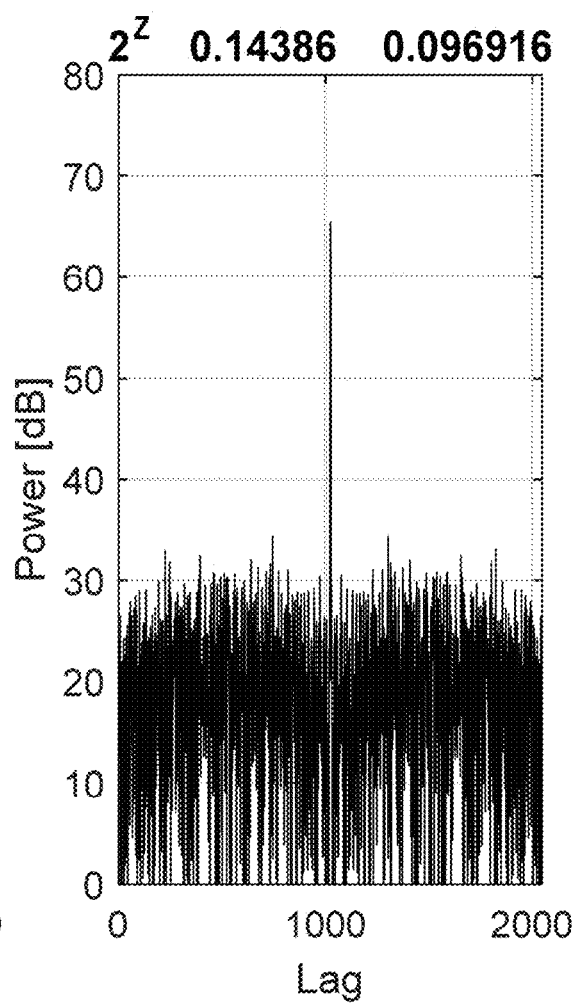

For example, a m-sequence 23 of size $2^Z-1$, where Z=10, and up-sampled by factor of K=2 was used to compare zero padding with semi-random insertions. FIG. 9A and FIG. 9B are graphs that illustrate example sidelobe reduction achieved by semi-random insertions, according to an implementation. The horizontal axes indicate lag in time (range) bins; and, the vertical axes indicate power relative to a reference in dB. FIG. 9A depicts autocorrelation with bits added to end, to pad to $2^Z$ length. FIG. 9B depicts autocorrelation of the same sequence where bits were inserted randomly to extend the code to length $2^Z$ samples. In this implementation, the m-sequence was up-sampled by a factor of 8, at which point one semi-random symbol was inserted randomly in each of eight sets of $2^Z-1$ symbols, before down sampling to 2 times native code rate. The two numbers above each of FIG. 9A and FIG. 9B represent the max and mean sidelobe levels (0.56886 and 0.34473, respectively, for FIG. 9A; and 0.14386 and 0.096916, respectively for FIG. 9B). These values demonstrate that this random selection of insertions achieved about 6 dB decrease in sidelobe level.

The pros and cons of the processing described so far in this section are described in Table 1.

TABLE 1

Comparisons of different approaches to use m-sequence codes

| Configuration | Pros | Cons |
| --- | --- | --- |
| $2^Z-1$ processing | Best correlation sidelobe performance | Inefficient FFT implementation for real-time processing hardware such as FPGA |
| Pad to $2^Z$ | Straightforward, current implementation | Largest root mean square (RMS) sidelobes under all conditions |
| Variable Hardware Clocking $2^Z-1$ Tx to $2^Z$ Rx samples | No additional DSP required | Hardware solution that uses extra clocking chip, etc. |
| Rx Interpolation | Relatively straightforward, only requires DSP modifications | Additional DSP to perform the interpolation. DSP processing requires processing $2^Z$ samples in time of $2^Z-1$ samples from ADC. |

TABLE 1-continued

Comparisons of different approaches to use m-sequence codes

| Configuration | Pros | Cons |
|---|---|---|
| Tx Interpolation | No additional DSP processing | Uses either DAC for output for linear interpolation implementation, or larger transmitter RAM block for random inserts in up-sampled implementation |

3.5 Selection of m-Sequence and Extraneous Spurs

Range spurs resulting from large internal reflections and the sidelobes of the phase coded LIDAR system were described in own previous work. These range spurs can give rise to false peaks and artifacts in the LIDAR image. At the time, a single specific m-sequence code was used for various system implementations; and, the dominant location of the sidelobe spur observed was at about 245 m, which for the utilized 625 Mbit/s code rate and 2048 bit long ($2^{11}$) phase code is about at half the range window. The half-range window region is also where a root mean square (rms) of the sidelobes is largest, so the prevalence of a specific range spur there was not unexpected.

Figure 10A:
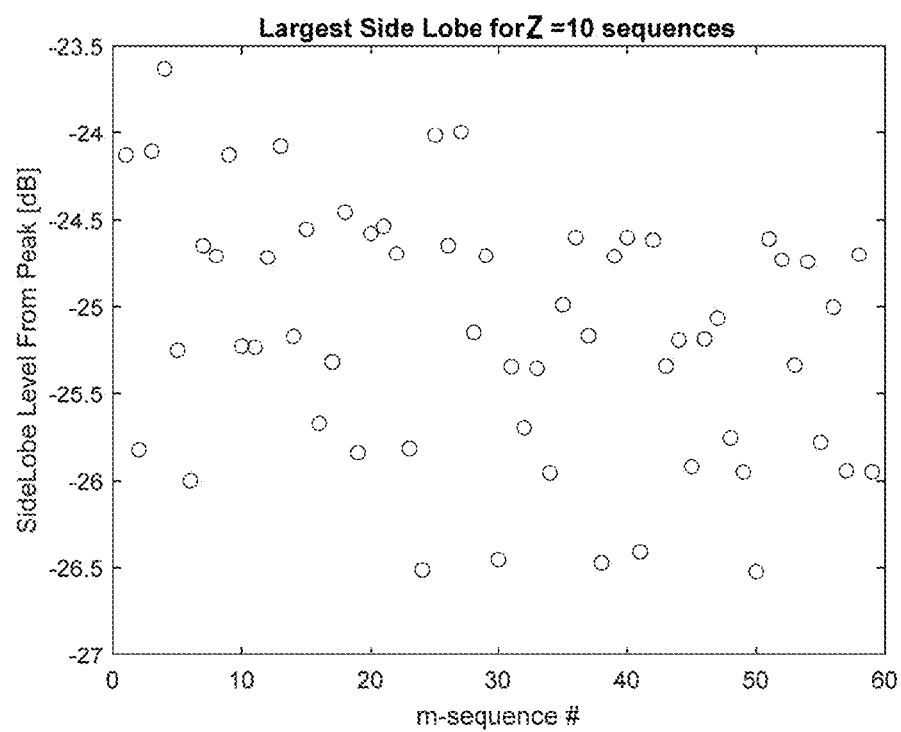
FIG. 10A through FIG. 10C are graphs that illustrate example characteristics of largest sidelobes, according to various implementations.
Figure 10B:
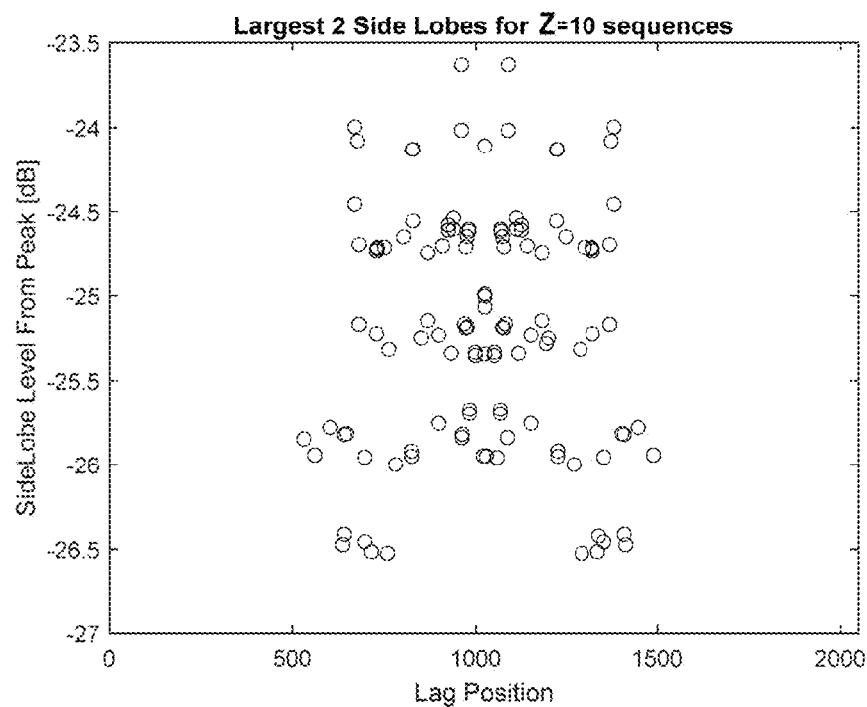
Figure 10C:
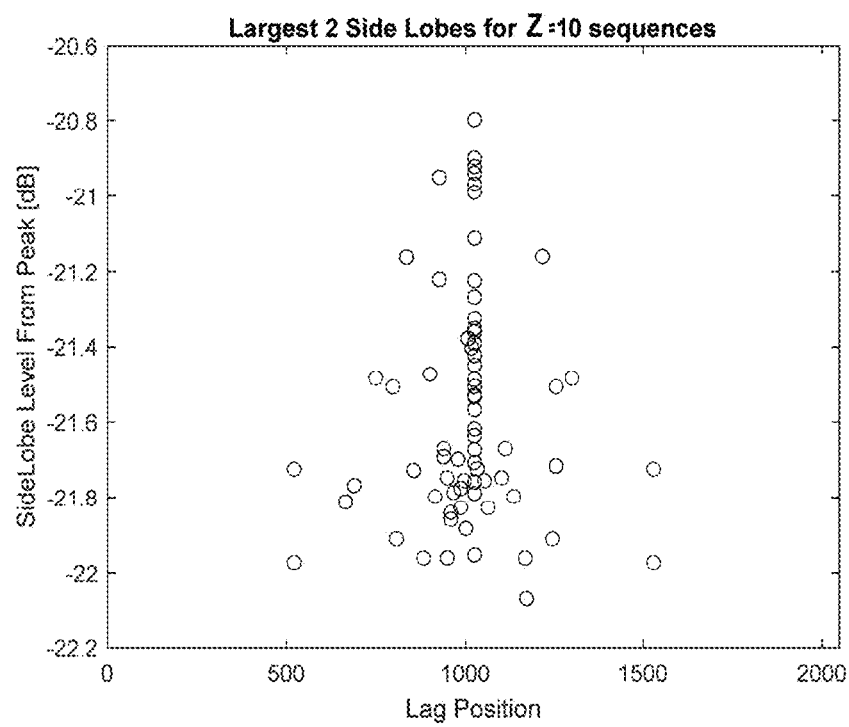

Different m-sequences for strength and location of spurs at zero-Doppler and in a limited space of Doppler frequencies are here explored. FIG. 10A through FIG. 10C are graphs that illustrate example characteristics of largest sidelobes, according to various implementations. While the rms sidelobe level of all the "m-sequences" of a certain length are identical, the peak sidelobe of the different codes for a specific Doppler shift can vary by as much as 3 dB. This is demonstrated, for example, in FIG. 10A. FIG. 10A is a graph that illustrates example largest sidelobe peak values for various m-sequences of size $2^{10}$-1 (i.e., Z=10), according to various implementations. The horizontal axis indicates m-sequence identifier that varies from 1 to 59; and, the vertical axis indicates power in dB, relative to the actual peak at zero lag. The corresponding peaks values vary between about −23.5 dB and about −26.5 dB, a range of 3 dB. In addition, the lag of the largest peak can vary by 1000 samples, as demonstrated in FIG. 10B. FIG. 10B is a graph that illustrates example two largest sidelobe peak values and lag positions for various m-sequences of size $2^{10}$-1 (i.e., Z=10), according to various implementations. The horizontal axis indicates lag position from 0 to 2000 samples; and, the vertical axis indicates power in dB, relative to the actual peak at zero lag. The corresponding peaks values vary as above; but, the lag positions vary between 500 and 1500 lag positions, a range of 1000 lag positions (samples). The largest sidelobe level can vary in lag position as shown in FIG. 10B by 1000 samples. The variation appears to be symmetric about a lag of 1000 samples. The two largest peaks tend to be mirror lags of each other. This applies perfectly in the idealized case, but asymmetries develop with Doppler shifts and signal distortions.

FIG. 10A and FIG. 10B, show the variation in largest sidelobe peaks values and positions for zero Doppler. The results change when considering different Doppler bins. Here a cross-correlation is computed between emitted signal and (simulated) Doppler shifted return. FIG. 10C is a graph that illustrates example two largest sidelobe peak values and lag positions for various m-sequences of size $2^{10}$-1 (i.e., Z=10), within the −100 to 100 Doppler bins. The horizontal axis indicates lag position from 0 to 2000 samples; and, the vertical axis indicates power in dB, relative to the actual peak at zero lag. The increase in overall sidelobe level (from −23 to −20) indicates that the worst sidelobes occur for Doppler away from zero. This analysis shows that in the two-dimensional lag-Doppler space, the largest sidelobe often occurs not along the Doppler=0 line, but often occurs when there is a non-zero Doppler shift.

By considering multiple Doppler bins the difference between the 59 m-sequence codes converges to about 1 dB as shown in FIG. 11C, as larger sidebands exist at different Doppler shift values in the different codes. This fact degrades the utility of identifying "good" codes or sequences among the different m-sequences based on ideal operation. Thus, with this idealized analysis, no preferred m-sequence code can be recommended for any implementation.

However, during the investigation of refined processing methods for the m-sequences in phase coded LIDAR it was discovered that during processing, a dominant range spur at specific range offset can be created if the signal is distorted.

Spurious peaks (spurs) are observed in both measurements and simulations. Recall in Equation 11, above, that, for the linearly interpolated plots, C(t) is not interpolated before being inserted into V(t). However, it was possible to generate spurs if C(t) is interpolated before being inserted into Equation 11. When simulations were implemented in this way, a strong dominant range spur in the autocorrelation was observed that happened to be suspiciously close to the dominant spur observed in operational LIDAR systems.

Figure 11A:
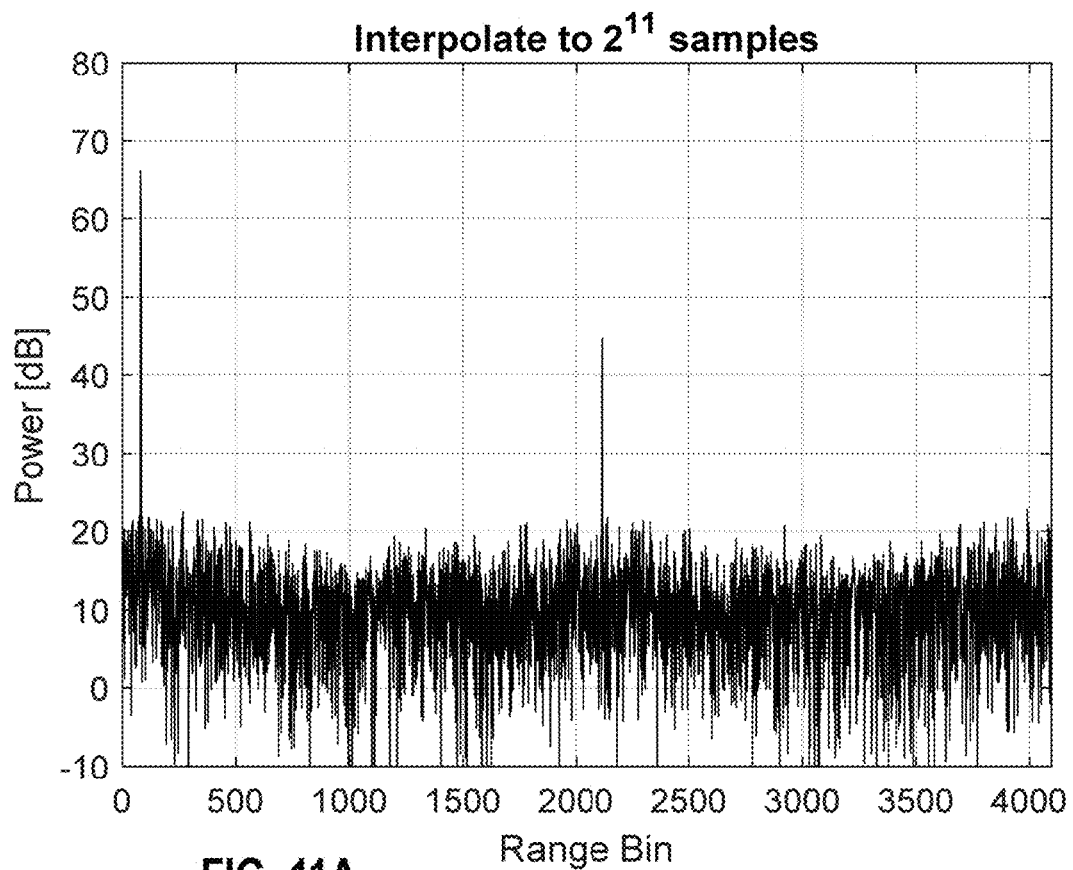
FIG. 11A and FIG. 11B are plots that illustrate example spurs in simulations of autocorrelations for different m-sequence codes, according to an implementation.
Figure 11B:
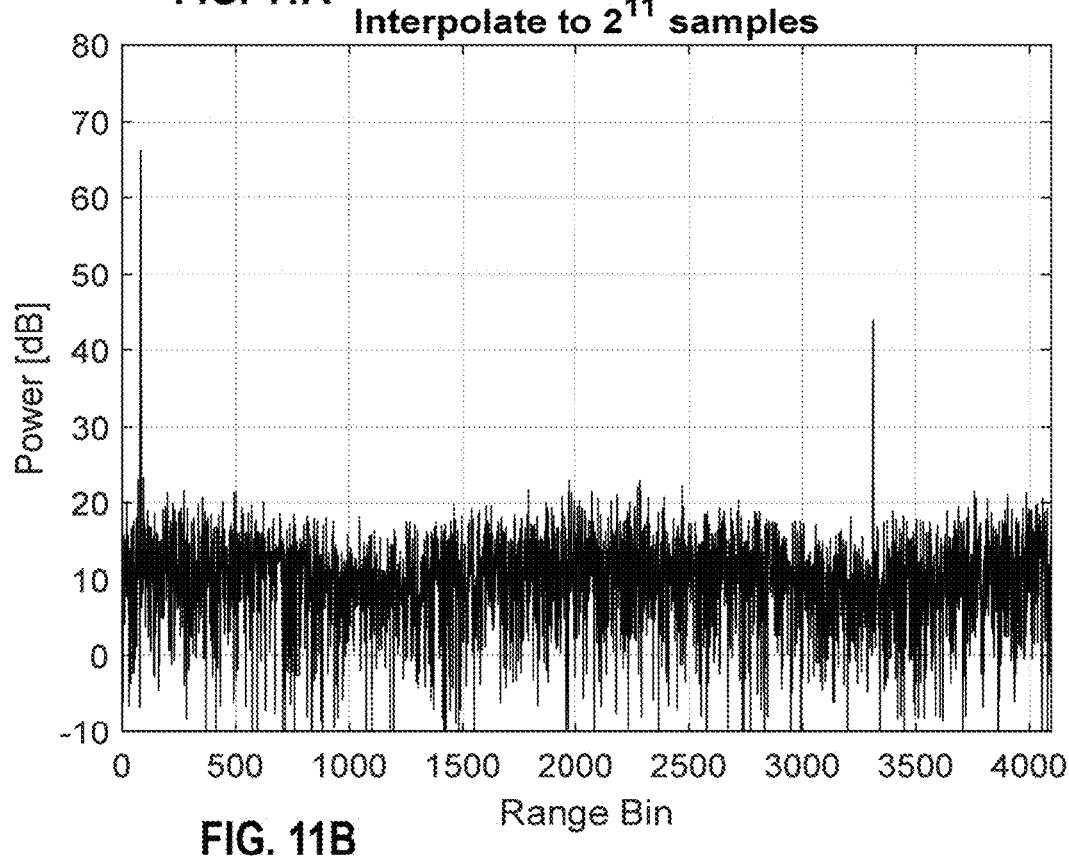

In addition, when a different choice of m-sequence was chosen in the simulation, the lag location of the dominant spur changed. FIG. 11A and FIG. 11B are plots that illustrate example spurs in simulations of autocorrelations for different m-sequence codes, according to an implementation. The horizontal axes indicate range bin number; and the vertical axes indicates power in dB relative to an arbitrary reference. FIG. 11A is the simulated autocorrelation of a distorted received signal with averaging of C(t) for m-sequence N=11, #1 taps=100000000101 from Church. The simulated autocorrelation shows a dominant spur at 2038 range bins away (corresponding to a range of approximately 245 m). Sequence #43 is the sequence previously used in example own LIDAR systems. FIG. 11B is the simulated autocorrelation of a distorted received signal with averaging of C(t) for m-sequence N=11, #23 taps=100100001101 from Church. The simulated autocorrelation shows a dominant spur at 3230 range bins away (corresponding to a range of approximately 388 m).

Figure 12:
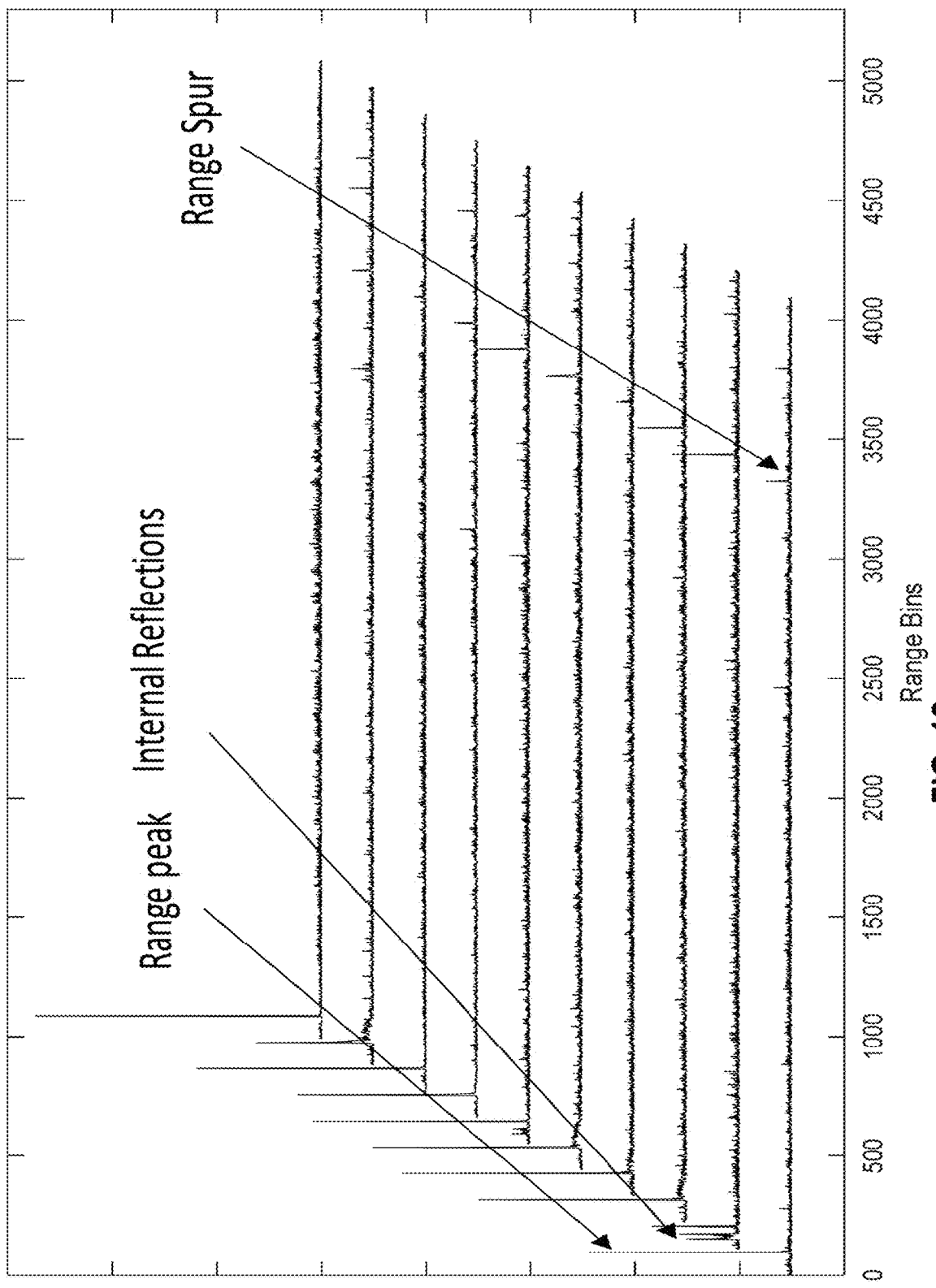
FIG. 12 is a graph that illustrates an example waterfall plot of range profiles using the m-sequence of FIG. 11B, according to an implementation.

This was confirmed with experimental data from coherent LIDAR systems showing the presence of a dominant spur at approximately 3230 bins. FIG. 12 is a graph that illustrates an example waterfall plot of range profiles using the m-sequence of FIG. 11B, according to an implementation. FIG. 12 depicts a series of range profiles in a waterfall plot (each line shifted up and to the right for clarity), with a horizontal axis indicating range bin and a vertical axis indicating power. An object at a range corresponding to a range bin is expected to produce a peak in power in that range bin. In addition to the range peak of an actual object at a range bin near 100, and some closer-in peaks due to internal reflections, there is a persistent spurious peak (spur) at a range bin of about 3400, close to the simulated spur at 3230 for the same m-sequence. This confirmed that distortion in the m-sequence phase code leads to a dominant and predictable range spur. This was further confirmed by trying different m-sequences and seeing the shift of the dominant range spur artifact as expected from the simulations. Thus, one can infer that hardware implementations of m-sequence codes effectively implements a filtering transformation similar to Equation 11 with filtered C(t) over K repeats. This means that Equation 11 with averaged C(t) can be used to estimate the location of spurious peaks for such hardware implementations.

Figure 13A:
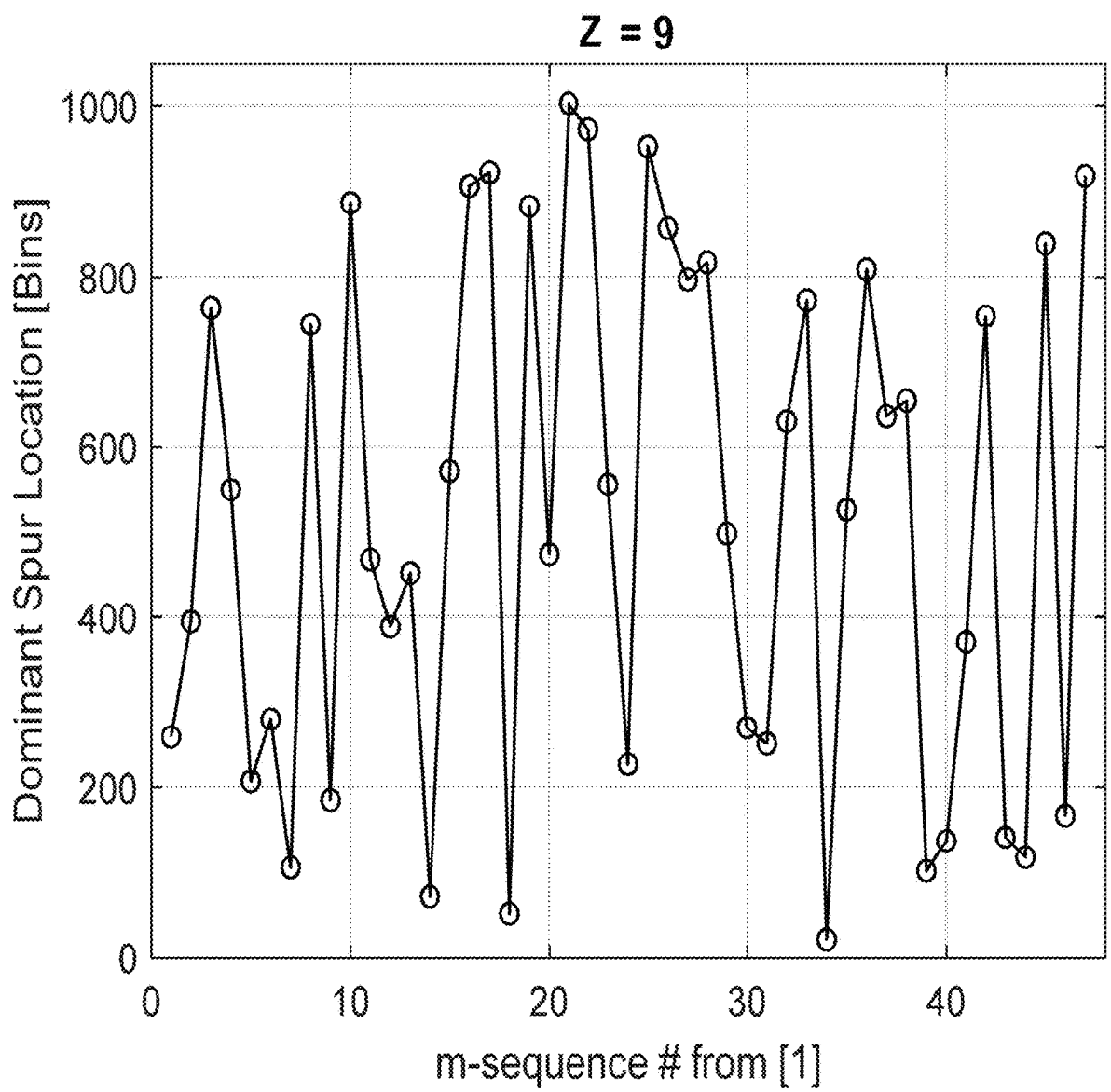
FIG. 13A through FIG. 13C are graphs that illustrate example dominant range spurs for each m-sequence of size Z=9, Z=10, and Z=11, respectively, according to various implementations.
Figure 13B:
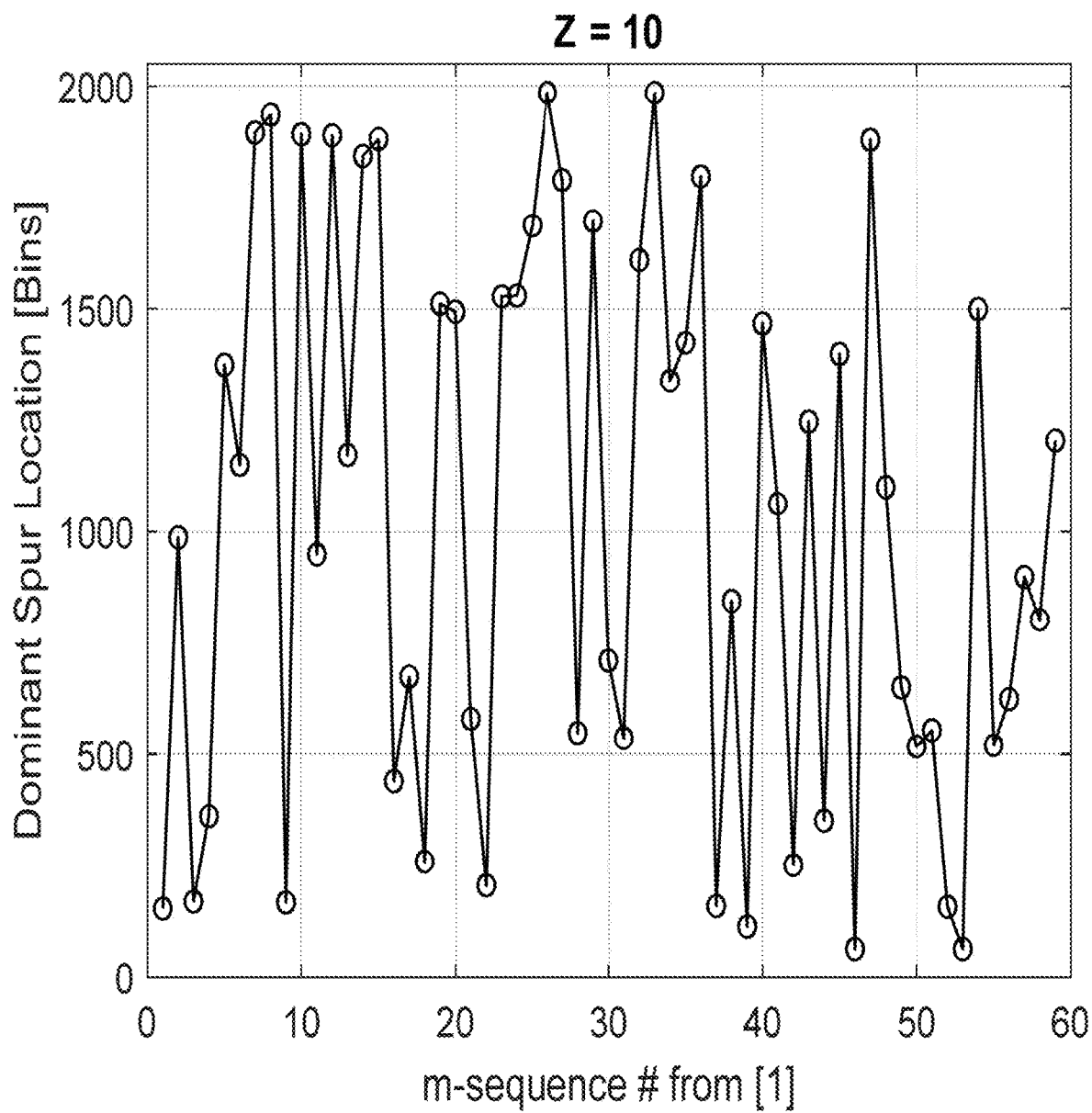
Figure 13C:
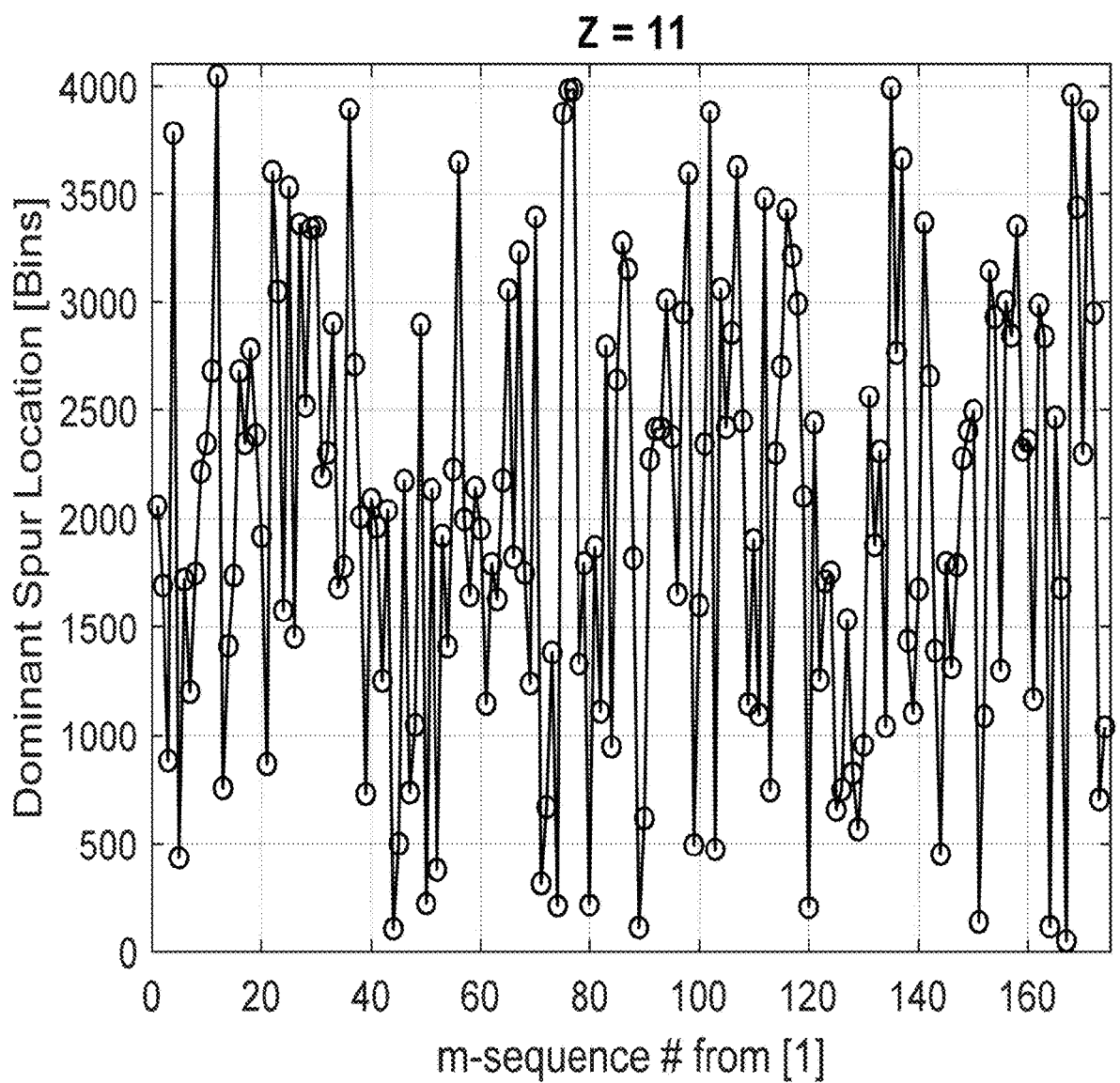

Once a reliable technique for determining the location of this dominant range spur was found (e.g., using Equation 11 with averaging of C(t)), all of the specific primitive sequences of length N=9, 10 and 11 in Church were processed; and; the location of the dominant range spur is computed for each m-sequence. FIG. 13A through FIG. 13C are graphs that illustrate example dominant range spurs for each m-sequence of size Z=9, Z=10, and Z=11, respectively, according to various implementations. The horizontal axis indicates arbitrary sequence number; and, the vertical axis indicates range bin with the spurious peak. The number of m-sequences are 47 for Z=9, 59 for Z=10, and 174 for Z=11. For any application, it is advantageous to select (e.g., determine, choose, etc.) an m-sequence with a spur in a range bin that is easily eliminated, e.g., one at about a factor of ten away from (or offset from) an expected range.

For example, for automotive LIDAR applications, the effective actual range (e.g., the "expected" range) may be significantly less than the maximum unambiguous range provided by the coded LIDAR parameters. In such a case, it is advantageous to choose (e.g., select, determine, etc.) an m-sequence whose dominant range spur is located at a large offset as this spur would appear at long range where no returns are expected and therefore can be ignored. Thus, it is advantageous for automotive LIDAR scenarios to select from among the m-sequences defined in Table 2, each of whose autocorrelation spur occurs at a lag >90% of the maximum unambiguous range. The Church taps are listed in Table 2 for unambiguous definition.

TABLE 2

Table of m-sequences formed from the primitive polynomials of Z = 11 with dominant range spur greater than 90% of the range window offset from the main peak.

Primitive (irreducible) Polynomial Taps

| | | | | | | | | | | | |
|---|---|---|---|---|---|---|---|---|---|---|---|
| 1 | 0 | 1 | 1 | 0 | 1 | 0 | 0 | 0 | 0 | 0 | 1 |
| 1 | 1 | 1 | 1 | 1 | 0 | 0 | 1 | 0 | 0 | 0 | 1 |
| 1 | 1 | 0 | 1 | 0 | 1 | 0 | 1 | 1 | 0 | 0 | 1 |
| 1 | 0 | 1 | 0 | 0 | 1 | 1 | 0 | 1 | 1 | 0 | 1 |
| 1 | 1 | 1 | 1 | 0 | 1 | 1 | 0 | 1 | 1 | 0 | 1 |
| 1 | 0 | 1 | 1 | 1 | 1 | 1 | 0 | 1 | 1 | 0 | 1 |
| 1 | 0 | 1 | 1 | 1 | 0 | 0 | 1 | 0 | 0 | 1 | 1 |
| 1 | 0 | 1 | 0 | 0 | 0 | 0 | 0 | 0 | 1 | 1 | 1 |
| 1 | 1 | 1 | 0 | 1 | 0 | 0 | 1 | 1 | 1 | 1 | 1 |
| 1 | 0 | 1 | 1 | 0 | 1 | 0 | 1 | 1 | 1 | 1 | 1 |

Figure 14A:
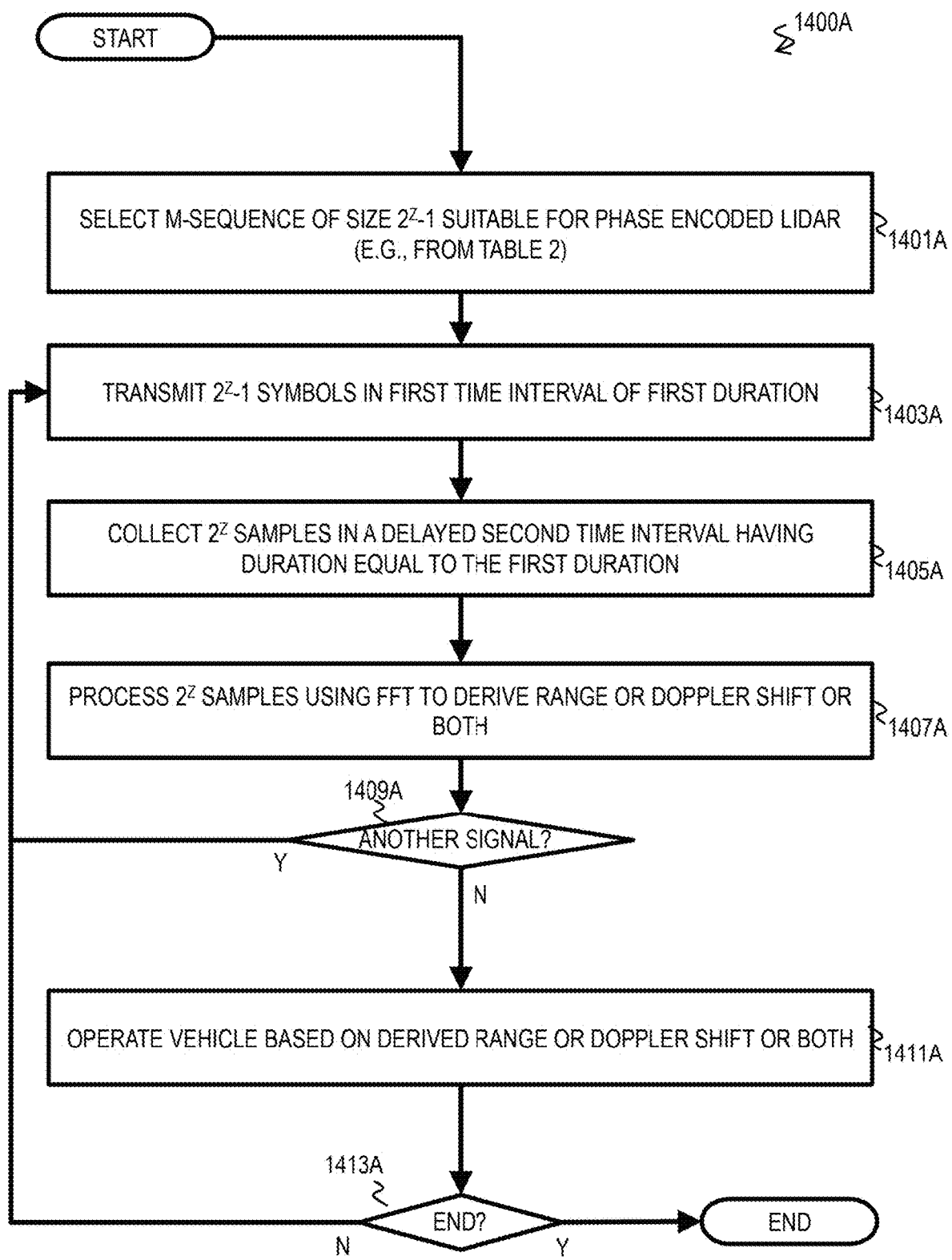
FIG. 14A is a flow diagram that illustrates an example method to reduce sidelobes in efficient FFT processing of phase-encoded LIDAR, according to an implementation.

3.6 Method to Reduce Sidelobes in Efficient FFT Processing of Phase-Encoded LIDAR FIG. 14A is a flow diagram that illustrates an example method 1400A to reduce sidelobes in efficient FFT processing of phase-encoded LIDAR, according to an implementation. Although the method 1400A is depicted as integral operations in a particular order for purposes of illustration, in other implementations one or more operations, or portions thereof, are arrange in a different order, in series or overlapping in time, or are omitted, or additional operations are added. In some embodiments, some or all operations of method 1400A may be performed by one or more LIDAR systems, such as LIDAR system 200 in FIG. 2, LIDAR system 300 in FIG. 3, and/or LIDAR system 500 in FIG. 5. For example, in some embodiments, operations 1401A and 1405A through 1413A may be performed by processing system 250 in FIG. 3 and/or processing system 250 in FIG. 5.

In operation 1401A, an m-sequence is selected for use as a code for phase-encoded LIDAR, such as high resolution Doppler LIDAR, e.g., mounted on or near a vehicle and configured to contribute to the operation of the vehicle. For example, in some automotive vehicle operations, the m-sequence is selected from Table 2. The selected m-sequence has exactly $2^Z-1$ binary symbols, where Z is selected in a range from 1 to 100, and typically in a range from 9 to 11 for automotive vehicles.

In operation 1403A, the $2^Z-1$ symbols are transmitted in a first time interval having a first duration. In some implementations, the first duration is selected on the order of nanoseconds to milliseconds, and advantageously on the order of a microsecond for automotive operations. In several implementations, the first duration is dictated by the time to collect $2^Z$ samples. This can be accomplished, in some implementations, by stepping down a clock signal relative to a clock signal for sampling a return waveform, as described above in section 3.1. In some implementations, this is accomplished by interpolation as described in section 3.3. For example, the $2^Z-1$ symbols of the m-sequence are up-sampled by a factor K. This up-sampled binary waveform is then filtered with a low-pass, digital filter having corner frequency near the sample rate. This smoothed waveform is then interpolated to generate $2^Z$ points. In some implementations, this is accomplished, as described in section 3.4, by semi-randomly inserting symbols in an up-sampled code, so that the inserted symbols lengthen the sequence to the first duration without padding with zeros.

In operation 1405A, $2^Z$ samples are collected in a delayed second time interval having a duration equal to the first duration. In some implementations, this is the natural time to take $2^Z$ samples because the transmit symbols were expanded to that duration, as described in section 3.1, 3.3 or 3.4. In some implementations, the $2^Z$ samples are collected faster—in a duration that is natural for transmitting $2^Z-1$ symbols, by interpolation as described above in section 3.2. Each received signal is interpolated to $2^Z$ points.

In operation 1407A, the $2^Z$ samples collected in operation 1405A are processed using efficient power of two FFT to derive range or Doppler shift or both. For example, the spectrum, or cross-correlation of real and imaginary parts, is computed using FFT processing.

In operation 1409A, it is determined whether another signal is to be sent. If so, control passes back to operation 1403A; and the loop of operations 1403A through 1409A is repeated until no new signals are desired for a particular use.

When sufficient signals have been transmitted, control passes to operation 1411A to use the derived range or Doppler shift or both, e.g., to control or assist the operation of a vehicle. After the derived range or Doppler shift or both are used, in operation 1413A it is determined if end conditions are satisfied, e.g., the vehicle operations have ceased. If not, then control passes back to operation 1403A and the loop through operation 1409A is again repeated as desired. If so, then the process ends.

FIG. 14B is a flow diagram that illustrates an example method 1400B to reduce sidelobes in efficient FFT processing of phase-encoded LIDAR, according to an implementation. Although the method 1400B is depicted as integral operations in a particular order for purposes of illustration, in other implementations one or more operations, or portions thereof, are arrange in a different order, in series or overlapping in time, or are omitted, or additional operations are added. In some embodiments, some or all operations of method 1400B may be performed by one or more LIDAR systems, such as LIDAR system 200 in FIG. 2, LIDAR system 300 in FIG. 3, and/or LIDAR system 500 in FIG. 5. For example, in some embodiments, operations 1401B and 1405B through 1413B may be performed by processing system 250 in FIG. 3 and/or processing system 250 in FIG. 5.

The method 1400B includes operation 1401B of determining a sequence code that is indicative of a sequence of phases for an optical signal. The method 1400B includes the operations 1403B of modulating an optical signal based on the sequence code to produce a phase-encoded optical signal. The method 1400B includes the operations 1405B of transmitting the phase-encoded optical signal to an environment. The method 1400B includes the operations 1407B of receiving, from the environment, a returned optical signal in response to transmitting the phase-encoded optical signal. The method 1400B includes the operations 1409B of generating, based on the returned optical signal, an electrical signal. The method 1400B includes the operations 14011B of determining a Doppler frequency shift in the returned optical signal based on the electrical signal.

5. Computational Hardware Overview

Figure 15:
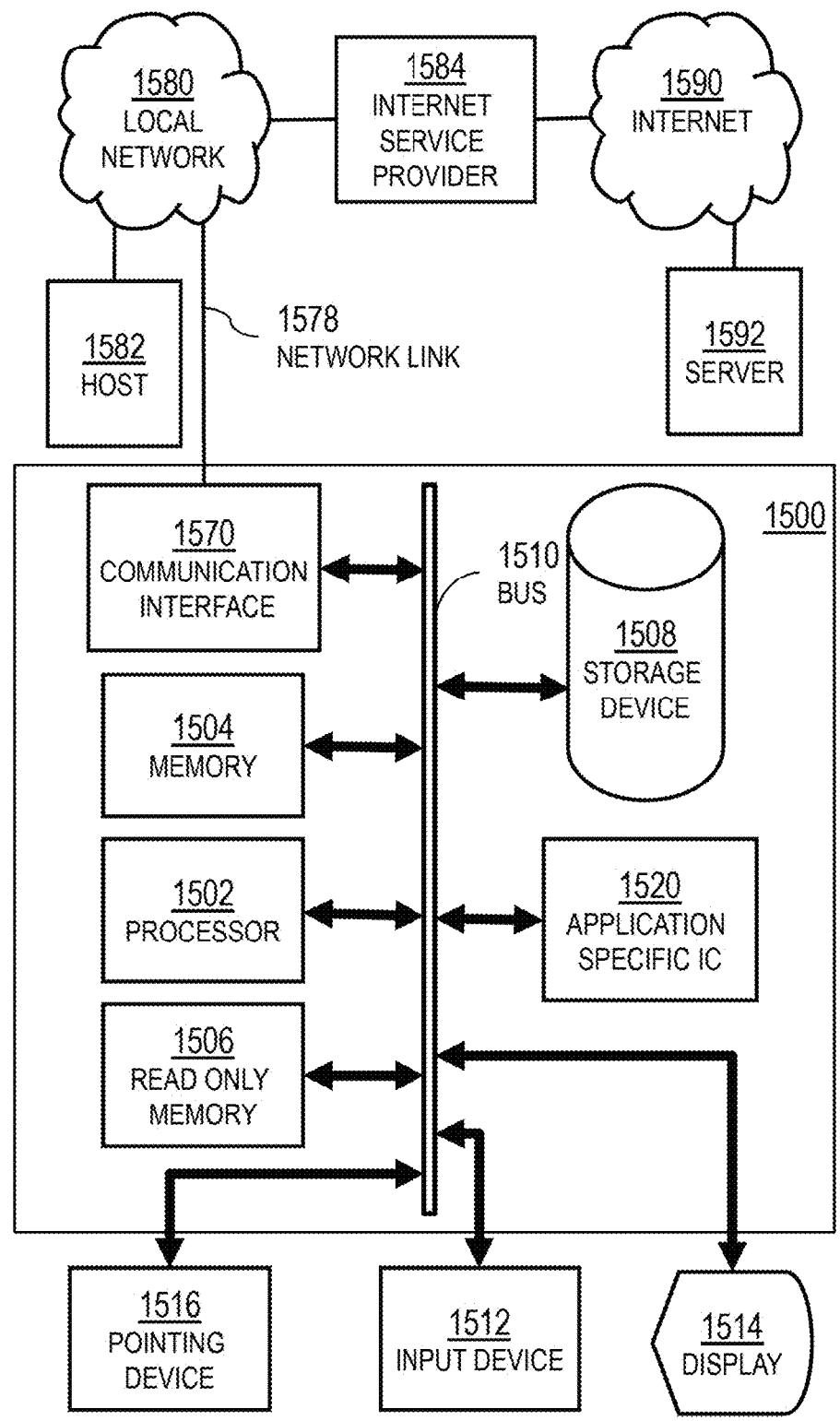
FIG. 15 is a block diagram that illustrates a computer system upon which one or more features of the present disclosure may be implemented.

FIG. 15 is a block diagram that illustrates a computer system 1500 upon which an implementation of the present disclosure may be implemented. Computer system 1500 includes a communication mechanism such as a bus 1510 for passing information between other internal and external components of the computer system 1500. Information is represented as physical signals of a measurable phenomenon, typically electric voltages, but including, in other implementations, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some implementations, information called analog data is represented by a near continuum of measurable values within a particular range. Computer system 1500, or a portion thereof, constitutes a means for performing one or more operations of one or more methods described herein.

A sequence of binary digits constitutes digital data that is used to represent a number or code for a character. A bus 1510 includes many parallel conductors of information so that information is transferred quickly among devices coupled to the bus 1510. One or more processors 1502 for processing information are coupled with the bus 1510. A processor 1502 performs a set of operations on information. The set of operations include bringing information in from the bus 1510 and placing information on the bus 1510. The set of operations also typically include comparing two or more units of information, shifting positions of units of information, and combining two or more units of information, such as by addition or multiplication. A sequence of operations to be executed by the processor 1502 constitutes computer instructions.

Computer system 1500 also includes a memory 1504 coupled to bus 1510. The memory 1504, such as a random access memory (RAM) or other dynamic storage device, stores information including computer instructions. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of computer instructions. The computer system 1500 also includes a read only memory (ROM) 1506 or other static storage device coupled to the bus 1510 for storing static information, including instructions, that is not changed by the computer system 1500. Also coupled to bus 1510 is a non-volatile (persistent) storage device 1508, such as a magnetic disk or optical disk, for storing information, including instructions, that persists even when the computer system 1500 is turned off or otherwise loses power.

Information, including instructions, is provided to the bus 1510 for use by the processor from an external input device 1512, such as a keyboard containing alphanumeric keys operated by a human user, or a sensor. A sensor detects conditions in its vicinity and transforms those detections into signals compatible with the signals used to represent information in computer system 1500. Other external devices coupled to bus 1510, used primarily for interacting with humans, include a display device 1514, such as a cathode ray tube (CRT) or a liquid crystal display (LCD), for presenting images, and a pointing device 1516, such as a mouse or a trackball or cursor direction keys, for controlling a position of a small cursor image presented on the display 1514 and issuing commands associated with graphical elements presented on the display 1514.

In the illustrated implementation, special purpose hardware, such as an application specific integrated circuit (IC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some implementations, communications interface 1570 is an integrated services digital network (ISDN) card or a digital subscriber line (DSL) card or a telephone modem that provides an information communication connection to a corresponding type of telephone line. In some implementations, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1570 sends and receives electrical, acoustic or electromagnetic signals, including infrared and optical signals, that carry information streams, such as digital data.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1502, except for carrier waves and other signals.

Logic encoded in one or more tangible media includes one or both of processor instructions on a computer-readable storage media and special purpose hardware, such as ASIC 1520.

Network link 1578 typically provides information communication through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590. A computer called a server 1592 connected to the Internet provides a service in response to information received over the Internet. For example, server 1592 provides information representing video data for presentation at display 1514.

The present disclosure is related to the use of computer system 1500 for implementing the techniques described herein. According to one implementation of the present disclosure, those techniques are performed by computer system 1500 in response to processor 1502 executing one or more sequences of one or more instructions contained in memory 1504. Such instructions, also called software and program code, may be read into memory 1504 from another computer-readable medium such as storage device 1508. Execution of the sequences of instructions contained in memory 1504 causes processor 1502 to perform the method operations described herein. In alternative implementations, hardware, such as application specific integrated circuit 1520, may be used in place of or in combination with software to implement the present disclosure. Thus, implementations of the present disclosure are not limited to any specific combination of hardware and software.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server 1592 transmits program code for a particular application, requested by a message sent from computer 1500, through Internet 1590, ISP equipment 1584, local network 1580 and communications interface 1570. The received code may be executed by processor 1502 as it is received, or may be stored in storage device 1508 or other non-volatile storage for later execution, or both. In this manner, computer system 1500 may obtain application program code in the form of a signal on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red a carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

Figure 16:
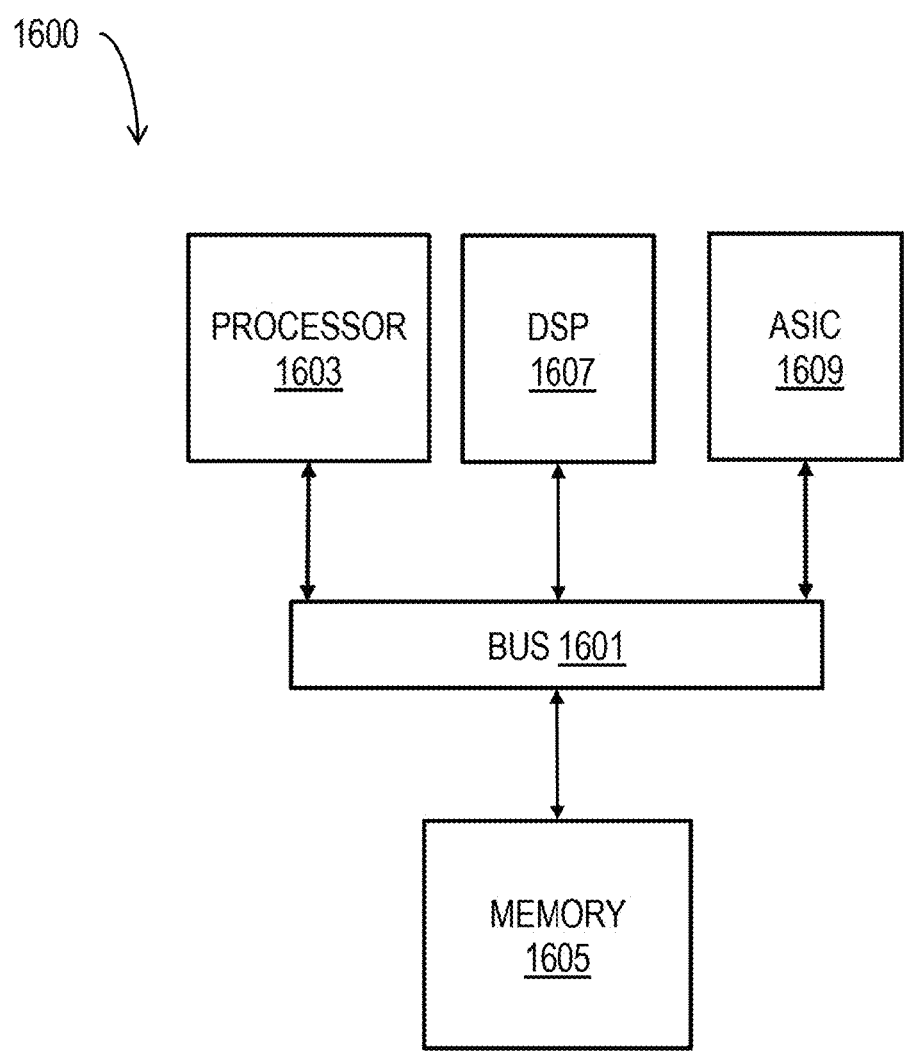
FIG. 16 illustrates a chip set upon which one or more features of the present disclosure may be implemented.

FIG. 16 illustrates a chip set 1600 upon which one or more features of the present disclosure may be implemented. Chip set 1600 is programmed to perform one or more operations of a method described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain implementations the chip set can be implemented in a single chip. Chip set 1600, or a portion thereof, constitutes a means for performing one or more operations of a method described herein.

In one implementation, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform one or more operations of a method described herein. The memory 1605 also stores the data associated with or generated by the execution of one or more operations of the methods described herein.

6. Alterations, Extensions and Modifications

In the foregoing specification, the present disclosure has been described with reference to specific implementations thereof. It will, however, be evident that various modifications and changes may be made thereto without departing from the broader spirit and scope of the present disclosure. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or operation or group of items, elements or operations but not the exclusion of any other item, element or operation or group of items, elements or operations. Furthermore, the indefinite article "a" or "an" is meant to indicate one or more of the item, element or operation modified by the article. As used herein, unless otherwise clear from the context, a value is "about" another value if it is within a factor of two (twice or half) of the other value. While example ranges are given, unless otherwise clear from the context, any contained ranges are also intended in various implementations. Thus, a range from 0 to 10 includes the range 1 to 4 in some implementations.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5 X to 2 X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some implementations of the present disclosure are described below in the context of binary, $\pi/2$ (90 degree) phase encoding at a radio frequency modulated onto an optical signal; but, implementations are not limited to this context. In other implementations, other phase encoding is used, with different phase differences (e.g., 30, 60, or 180 degrees) or encoding with 3 or more different phases. Implementations are described in the context of a single optical beam and its return on a single detector or pair of detectors, which in other implementations can then be scanned using any known scanning means, such as linear stepping or rotating optical components or with arrays of transmitters or arrays of detectors or pairs of detectors.

What is claimed:

1. A light detection and ranging (LIDAR) system, the LIDAR system comprising:
one or more processors; and one or more computer-readable storage mediums storing instructions which, when executed by the one or more processors, cause the one or more processors to:
determine a code that has a first set of symbols having a first number of symbols;
transmit, to an environment, an optical signal generated based on the code such that the first set of symbols are transmitted in a first duration;
in response to transmitting the optical signal, receive a returned optical signal that is reflected from an object in the environment;
determine a second number of symbols to be sampled, the second number of symbols being different than the first number of symbols;
sample, from the returned optical signal in a second duration, a second set of symbols having the determined second number of symbols; and
determine, based on the second set of symbols, a range to the object.

2. The LIDAR system as recited in claim 1, wherein the second duration has the same length as the first duration.

3. The LIDAR system as recited in claim 1, wherein
the second set of symbols are sampled based on a first clock signal, and
the one or more processors are further configured to:
adjust the first clock signal to generate a second clock signal based on which another set of symbols are to be transmitted, wherein the another set of symbols have the first number of symbols.

4. The LIDAR system as recited in claim 1, wherein in transmitting the first set of symbols, the one or more processors are further configured to pad the code by adding one or more extra symbols to the code such that the code has the second number of symbols.

5. The LIDAR system as recited in claim 4, wherein the one or more extra symbols are inserted to the code at an insertion location such that a symbol of the inserted symbols matches at least one of symbols that are adjacent to the insertion location.

6. The LIDAR system as recited in claim 1, wherein in transmitting the first set of symbols, the one or more processors are further configured to:
perform an interpolation on the first set of symbols to generate a third set of symbols in the code, such that the code has the second number of symbols.

7. The LIDAR system as recited in claim 1, wherein in transmitting the first set of symbols, the one or more processors are further configured to:
up-sample the code to generate a sampled signal; and
filter the sampled signal to generate a smoothed signal.

8. The LIDAR system as recited in claim 1, wherein in sampling the second set of symbols, the one or more processors are further configured to:
sample, from the returned optical signal, a fourth set of symbols; and
perform an interpolation on the fourth set of symbols to generate the second set of symbols.

9. The LIDAR system as recited in claim 1, wherein the one or more processors are further configured to:
generate, based on the returned optical signal, an electrical signal; and
determine the range to the object based on a Fourier Transform of the electrical signal.

10. An autonomous vehicle control system comprising:
one or more processors; and one or more computer-readable storage mediums storing instructions which, when executed by the one or more processors, cause the one or more processors to:
determine a code that has a first set of symbols having a first number of symbols;
transmit, to an environment, an optical signal generated based on the code such that the first set of symbols are transmitted in a first duration;
in response to transmitting the optical signal, receive a returned optical signal that is reflected from an object in the environment;
determine a second number of symbols to be sampled, the second number of symbols being different than the first number of symbols;
sample, from the returned optical signal in a second duration, a second set of symbols having the determined second number of symbols;
determine, based on the second set of symbols, a range to the object; and
control operation of a vehicle using the range to the object.

11. The autonomous vehicle control system as recited in claim 10, wherein the second duration has the same length as the first duration.

12. The autonomous vehicle control system as recited in claim 10, wherein
the second number of symbols are sampled based on a first clock signal, and
the one or more processors are further configured to:
adjust the first clock signal to generate a second clock signal based on which another set of symbols are to be transmitted, wherein the another set of symbols have the first number of symbols.

13. The autonomous vehicle control system as recited in claim 10, wherein in transmitting the first set of symbols, the one or more processors are further configured to pad the code by adding one or more extra symbols to the code such that the code has the second number of symbols.

14. The autonomous vehicle control system as recited in claim 13, wherein the one or more extra symbols are inserted to the code at an insertion location such that a symbol of the inserted symbols matches at least one of symbols that are adjacent to the insertion location.

15. The autonomous vehicle control system as recited in claim 10, wherein in transmitting the first set of symbols, the one or more processors are further configured to:
perform an interpolation on the first set of symbols to generate a third set of symbols in the code, such that the code has the second number of symbols.

16. The autonomous vehicle control system as recited in claim 10, wherein in transmitting the first number of symbols, the one or more processors are further configured to:
up-sample the code to generate a sampled signal; and
filter the sampled signal to generate a smoothed signal.

17. The autonomous vehicle control system as recited in claim 10, wherein in sampling the second set of symbols, the one or more processors are further configured to:
sample, from the returned optical signal, a fourth set of symbols; and
perform an interpolation on the fourth set of samples to generate the second set of samples.

18. The autonomous vehicle control system as recited in claim 10, wherein the one or more processors are further configured to:
generate, based on the returned optical signal, an electrical signal; and
determine the range to the object based on a power of two Fast Fourier Transform of the electrical signal.

19. An autonomous vehicle comprising:
at least one of a steering system or a braking system; and
a vehicle controller comprising one or more processors configured to:
determine a code that has a first set of symbols having a first number symbols;
transmit, to an environment, an optical signal generated based on the code such that the first set of symbols are transmitted in a first duration;
in response to transmitting the optical signal, receive a returned optical signal that is reflected from an object in the environment;
determine a second number of symbols to be sampled, the second number of symbols being different than the first number of symbols;
sample, from the returned optical signal in a second duration, a second set of symbols having the determined second number of symbols;
determine, based on the second set of symbols, a range to the object; and
control the at least one of the steering system or the braking system using the range to the object.

20. The autonomous vehicle as recited in claim 19, wherein the second duration has the same length as the first duration.

* * * * *